(12) United States Patent
Barsky et al.

(10) Patent No.: US 12,321,562 B2
(45) Date of Patent: *Jun. 3, 2025

(54) SYSTEMS AND METHODS FOR INTERACTING WITH THREE-DIMENSIONAL GRAPHICAL USER INTERFACE ELEMENTS TO CONTROL COMPUTER OPERATION

(71) Applicant: Illuscio, Inc., Culver City, CA (US)

(72) Inventors: Kevan Spencer Barsky, Los Angeles, CA (US); Joseph Bogacz, Perth (CA)

(73) Assignee: Illuscio, Inc., Culver City, CA (US)

( * ) Notice: Subject to any disclaimer, the term of this patent is extended or adjusted under 35 U.S.C. 154(b) by 124 days.

This patent is subject to a terminal disclaimer.

(21) Appl. No.: 18/359,222

(22) Filed: Jul. 26, 2023

(65) Prior Publication Data

US 2023/0400960 A1    Dec. 14, 2023

Related U.S. Application Data

(63) Continuation-in-part of application No. 18/163,516, filed on Feb. 2, 2023, now Pat. No. 12,093,501, which
(Continued)

(51) Int. Cl.
| | |
|---|---|
| *G06F 3/048* | (2013.01) |
| *G06F 3/04815* | (2022.01) |
| *G06F 3/04817* | (2022.01) |
| *G06F 3/0487* | (2013.01) |
| *G06F 9/451* | (2018.01) |

(52) U.S. Cl.
CPC ...... *G06F 3/04815* (2013.01); *G06F 3/04817* (2013.01); *G06F 3/0487* (2013.01); *G06F 9/451* (2018.02)

(58) Field of Classification Search
CPC ............. G06F 3/04815; G06F 3/04817; G06F 3/0487; G06F 2203/04802; G06T 7/75; G06T 19/00; G06T 17/20; G06T 15/04; G06T 15/08
See application file for complete search history.

(56) References Cited

U.S. PATENT DOCUMENTS

| | | | |
|---|---|---|---|
| 5,303,388 A | | 4/1994 | Kreitman et al. |
| 5,678,015 A | * | 10/1997 | Goh ................... G06F 3/04815 |
| | | | 715/848 |

(Continued)

FOREIGN PATENT DOCUMENTS

WO    WO-2022047436 A1 *  3/2022

*Primary Examiner* — Patrick F Riegler
(74) *Attorney, Agent, or Firm* — Ansari Katiraei LLP; Arman Katieraei; Sadiq Ansari

(57) ABSTRACT

Disclosed is an interface and/or system for presenting three-dimensional ("3D") graphical user interface ("GUI") elements to improve user interactions with a device. The system determines a first angle from which to render a 3D GUI. The system receives 3D images that are linked to the 3D GUI elements. The system generates the 3D GUI elements by rendering each of the 3D images from a first render position that aligns with the first angle. The system detects an input that changes the first angle to a second angle, and updates a visualization of the 3D GUI elements by rendering each of the 3D images from a second render position that aligns with the second angle.

18 Claims, 13 Drawing Sheets

Related U.S. Application Data is a continuation of application No. 17/838,393, filed on Jun. 13, 2022, now Pat. No. 11,579,748.

(56) References Cited

U.S. PATENT DOCUMENTS

| | | | |
|---|---|---|---|
| 6,266,098 B1 | 7/2001 | Cove et al. | |
| 7,937,668 B2* | 5/2011 | Yoshida | G06F 9/451 715/849 |
| 8,429,564 B2 | 4/2013 | Alexanderovitc et al. | |
| 8,560,960 B2* | 10/2013 | Goossens | G06F 3/04815 715/848 |
| 8,866,810 B2* | 10/2014 | Cho | G06F 1/1677 345/419 |
| 9,069,455 B2* | 6/2015 | Sripada | G06T 19/00 |
| 9,081,477 B2* | 7/2015 | Kang | G06F 3/04815 |
| 9,360,991 B2* | 6/2016 | Celebisoy | G06F 3/0488 |
| 9,576,393 B1 | 2/2017 | Bethel | G06F 3/04815 |
| 10,503,399 B2* | 12/2019 | Chu | G06F 3/0346 |
| 10,592,064 B2* | 3/2020 | Ames | G06F 1/1694 |
| 10,712,898 B2* | 7/2020 | Christmas | G06F 3/04815 |
| 11,127,223 B1* | 9/2021 | Bhushan | G06T 17/20 |
| 11,170,582 B1* | 11/2021 | McNeil | G06F 16/483 |
| 11,227,010 B1* | 1/2022 | Vieira De Souza | G06Q 30/02 |
| 11,385,728 B2* | 7/2022 | Seibert | G06F 3/04812 |
| 11,455,759 B2* | 9/2022 | Donalek | G06T 17/20 |
| 11,550,460 B1* | 1/2023 | Gangwani | G06F 3/0346 |
| 11,579,748 B1* | 2/2023 | Barsky | G06F 3/04883 |
| 11,635,873 B2* | 4/2023 | Shu | G06F 1/1643 715/719 |
| 2002/0000998 A1 | 1/2002 | Scott et al. | |
| 2003/0117440 A1 | 6/2003 | Hellyar et al. | |
| 2004/0155907 A1 | 8/2004 | Yamaguchi et al. | |
| 2005/0071767 A1 | 3/2005 | Kirkland | |
| 2006/0103733 A1* | 5/2006 | Grady | G06F 3/038 348/208.3 |
| 2006/0187204 A1 | 8/2006 | Yi et al. | |
| 2006/0242602 A1 | 10/2006 | Schechter et al. | |
| 2009/0089692 A1 | 4/2009 | Morris | |
| 2009/0164945 A1 | 6/2009 | Li | |
| 2010/0064259 A1* | 3/2010 | Alexanderovitc | G06F 3/04815 715/852 |
| 2010/0093400 A1 | 4/2010 | Ju et al. | |
| 2010/0227686 A1 | 9/2010 | Brunet De Courssou et al. | |
| 2011/0096006 A1* | 4/2011 | Jeong | H04M 1/72469 345/173 |
| 2011/0102460 A1 | 5/2011 | Parker | |
| 2011/0102556 A1 | 5/2011 | Kim et al. | |
| 2011/0283213 A1 | 11/2011 | Leebow | |
| 2011/0310100 A1 | 12/2011 | Adimatyam et al. | |
| 2012/0036433 A1* | 2/2012 | Zimmer | G06T 15/20 715/702 |
| 2012/0056900 A1 | 3/2012 | Park et al. | |
| 2012/0062564 A1 | 3/2012 | Miyashita et al. | |
| 2012/0260215 A1 | 10/2012 | Fennel | |
| 2012/0260217 A1 | 10/2012 | Celebisoy | |
| 2012/0260218 A1 | 10/2012 | Bawel | |
| 2012/0284668 A1* | 11/2012 | Bamford | G06F 3/04883 715/834 |
| 2013/0047121 A1 | 2/2013 | Kao et al. | |
| 2013/0145322 A1 | 6/2013 | Hendricks | |
| 2013/0185642 A1 | 7/2013 | Gammons | |
| 2013/0293686 A1* | 11/2013 | Blow | G06T 7/55 348/E13.074 |
| 2013/0311946 A1* | 11/2013 | Kwon | G06F 3/0482 715/811 |
| 2013/0336524 A1 | 12/2013 | Zhang et al. | |
| 2013/0346911 A1* | 12/2013 | Sripada | G06F 3/04817 715/782 |
| 2014/0007015 A1* | 1/2014 | Ekstrand | G06F 3/04817 715/835 |
| 2014/0213140 A1* | 7/2014 | Goh | A63H 3/28 446/175 |
| 2015/0009130 A1* | 1/2015 | Motta | G06F 3/0346 345/156 |
| 2015/0077323 A1* | 3/2015 | Ramaswamy | G06F 3/012 345/156 |
| 2015/0106851 A1* | 4/2015 | Pauli | G06F 3/0386 725/52 |
| 2015/0135105 A1 | 5/2015 | Jain et al. | |
| 2015/0138192 A1* | 5/2015 | Marchenko | G06F 3/04815 345/419 |
| 2015/0324114 A1* | 11/2015 | Hurley | G16Z 99/00 715/850 |
| 2016/0062636 A1 | 3/2016 | Jung et al. | |
| 2016/0171765 A1* | 6/2016 | Mehr | G06T 17/20 345/419 |
| 2016/0357399 A1* | 12/2016 | Shin | G06T 15/20 |
| 2017/0139548 A1 | 3/2017 | De Las Heras et al. | |
| 2017/0139587 A1* | 5/2017 | Bostick | G06F 3/04886 |
| 2017/0371039 A1 | 12/2017 | Clark et al. | |
| 2017/0371523 A1 | 12/2017 | Liao et al. | |
| 2018/0143756 A1* | 5/2018 | Mildrew | G06T 17/05 |
| 2019/0026004 A1 | 1/2019 | Caen | |
| 2019/0121522 A1 | 4/2019 | Davis et al. | |
| 2019/0156472 A1* | 5/2019 | Link | G06T 7/001 |
| 2019/0258225 A1* | 8/2019 | Link | G06T 7/70 |
| 2020/0012409 A1 | 1/2020 | Sadacharam et al. | |
| 2022/0261094 A1* | 8/2022 | Cole | G06F 3/0202 |
| 2023/0024225 A1* | 1/2023 | Zambetti | G06F 3/0362 |
| 2023/0139841 A1* | 5/2023 | DiMarco | G06T 7/75 345/419 |
| 2023/0328856 A1* | 10/2023 | Beaumier | G07F 17/305 715/716 |
| 2024/0000512 A1* | 1/2024 | Miles | A61B 34/10 |

* cited by examiner

SYSTEMS AND METHODS FOR INTERACTING WITH THREE-DIMENSIONAL GRAPHICAL USER INTERFACE ELEMENTS TO CONTROL COMPUTER OPERATION

CLAIM OF BENEFIT TO RELATED APPLICATIONS

This application is a continuation-in-part of U.S. nonprovisional application Ser. No. 18/163,516 entitled "Systems and Methods for Interacting with Three-Dimensional Graphical User Interface Elements to Control Computer Operation", filed Feb. 2, 2023 which is a continuation of U.S. nonprovisional application Ser. No. 17/838,393 entitled "Systems and Methods for Interacting with Three-Dimensional Graphical User Interface Elements to Control Computer Operation", filed Jun. 13, 2022 and issued as U.S. Pat. No. 11,579,748. The contents of application Ser. Nos. 18/163,516 and 17/838,393 are hereby incorporated by reference.

BACKGROUND

The two-dimensional ("2D") nature of icons, emojis, wallpapers, and other graphical user interface ("GUI") elements restricts their functionality and interactivity. For instance, the amount of information that may be presented in two dimensions is less than the amount of information that may be presented in three dimensions. Similarly, interactions with a 2D GUI element may be restricted to the x and y planes, whereas interactions with a three-dimensional ("3D") GUI element may be performed about the x, y, and z planes.

DETAILED DESCRIPTION OF PREFERRED EMBODIMENTS

The following detailed description refers to the accompanying drawings. The same reference numbers in different drawings may identify the same or similar elements.

Provided are systems and methods for interacting with three-dimensional ("3D") graphical user interface ("GUI") elements to control computer operation. The systems and methods may generate the 3D GUI elements from point clouds and/or other 3D file formats, may dynamically manipulate the 3D GUI elements with different 3D effects based on different sensor outputs, conditions, events, and/or user input, and/or may control the operation of a computer or other electronic device based on the 3D position at which a 3D GUI element is presented when input is provided relative to that GUI element.

The systems and methods may therefore include a GUI with one or more 3D GUI elements for simplifying and improving user interactions with a digital environment or a device, and for accessing different data, functionality, and operations of the digital environment or the device. Due to the different computer functionality that is performed in response to different 3D positional data associated with an interacted with 3D GUI element, there are no two-dimensional ("2D") counterparts or adaptations of 2D GUI elements for implementing the same controls or functionality.

The 3D GUI elements may include 3D icons, 3D emojis, 3D wallpapers, and/or other 3D objects that present different visual information and/or are associated with different executable functionality at different positions within the 3D space (e.g., different x, y, and z positions) represented by the 3D GUI element. In some embodiments, the 3D icons may include 3D GUI elements for launching an application, receiving data about an application, and/or otherwise interacting with an application in a closed, minimized, inactive, sleep, and/or unopened state. In some embodiments, the 3D icons may include 3D GUI elements within an application that has focus or is in an open or active state. In some such embodiments, a single 3D GUI element may be used to invoke different functions or operations of the application or to perform various interactions with the application.

In some embodiments, a 3D GUI element may be rotated and/or interacted with in various ways to expose the different visual information contained in the 3D space of that 3D GUI element. In some embodiments, the same 3D GUI element may be interacted with to invoke different functionality that is associated with the different visual information when that visual information is presented on the 3D GUI element.

The 3D GUI and 3D GUI elements may be implemented on various interactive devices that have a display. For instance, the 3D GUI and 3D GUI elements may be presented on a smartphone, handheld mobile device, laptop computer, desktop computer, headset, Internet-of-Things ("IoTs") device, controllers, and/or wearable devices (e.g., smartwatches).

Figure 1:
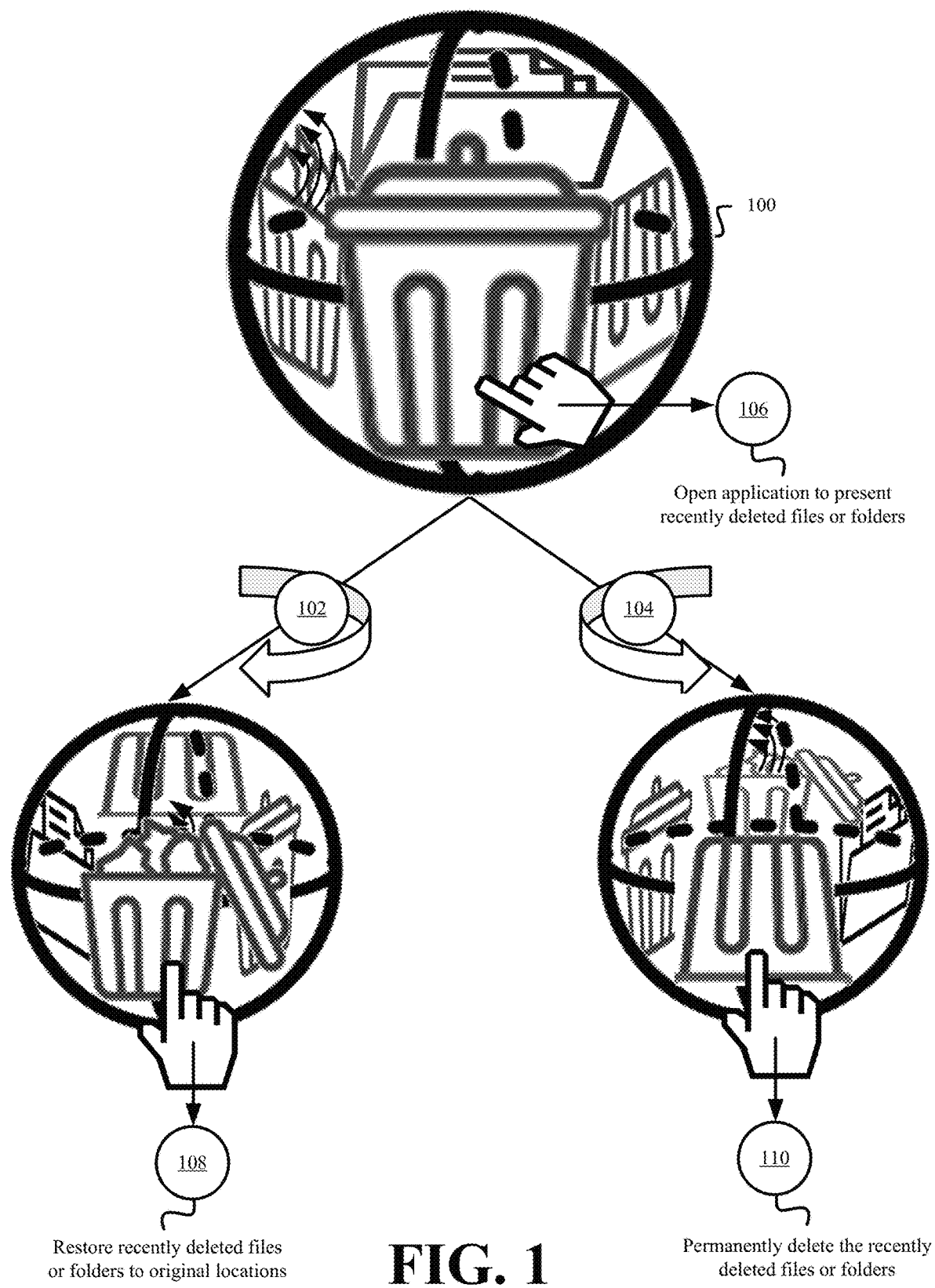
FIG. 1 illustrates an example of three-dimensional ("3D") icon for an application in a closed, minimized, inactive, sleep, and/or unopened state in accordance with some embodiments presented herein.

FIG. 1 illustrates an example of 3D icon 100 for an application in a closed, minimized, inactive, sleep, and/or unopened state in accordance with some embodiments presented herein. 3D icon 100 may include a 3D image that is rendered from x, y, and z positional data and non-positional data (e.g., visual information defined for each of the x, y, and z positions) contained within a point cloud or other 3D image file format. In some embodiments, 3D icon 100 may be presented as a volumetric, cubic, or spherical object. 3D icon 100 may be associated with one or more rules that control the rotation or movement of 3D icon 100 in response to no inputs, different sensor outputs, detected actions, detected events, and/or input that are directed to 3D icon 100 or the application that is accessed using 3D icon 100.

Different visual information may be defined at different positions within the point cloud or 3D image for 3D icon 100. For instance, at a default position, 3D icon 100 may include a first set of data points with positional and non-positional elements that generate a closed trash can image in the foreground, a second set of data points with positional and non-positional elements that generate a restore trash can image about the left side, a third set of data points with positional and non-positional elements that generate an empty trash can image about the right side, and a fourth set of data points with positional and non-positional elements that generate an open folder image in the back. Specifically, the first set of data points may include x, y, and z coordinates that position the first set of data points towards the front of the point cloud or 3D icon 100 when rendering 3D icon 100 from the default position, the second set of data points may include x, y, and z coordinates that position the second set of data points about the left side of the point cloud or 3D icon 100 when rendering 3D icon 100 from the default position, the third set of data points may include x, y, and z coordinates that position the third set of data points about the right side of the point cloud or 3D icon 100 when rendering 3D icon 100 from the default position, and the fourth set of data points may include x, y, and z coordinates that position the fourth set of data points about the rear of the point cloud or 3D icon 100 when rendering 3D icon 100 from the default position.

In some embodiments, the 3D GUI may rotate 3D icon 100 to present the different visual information in response to sensor output that indicates a rotation or movement of the device presenting the 3D GUI. For instance, the device may include a gyroscope or accelerometer that measures a rightward rotation of the device, and 3D icon 100 may be defined with a rule that generates a complementary rotation of 3D icon 100 based on the rightward rotation of the device. The rightward rotation of the device may cause movement away from the visual information about the front side of 3D icon 100 and movement towards the visual information about a left side of 3D icon 100. In other words, the 3D GUI may render different data points from the point cloud of 3D icon 100 at the position of 3D icon 100 within the 3D GUI as the device itself rotates. In some embodiments, the device may include a headset worn by a user, and 3D icon 100 may rotate in response to head movements or tracked eye movements. In some other embodiments, the device may include sensors that detect or map the position and/or orientation of the user (e.g., the user's face or head) relative to the device. Accordingly, in response to detecting movement of the user in a first direction, the 3D GUI may rotate 3D icon 100 in the corresponding first direction or an opposite second direction depending on the mapping of the detected motion to icon controls.

In some embodiments, the 3D GUI may rotate 3D icon 100 in response to user input provided to, over, or for 3D icon 100. For instance, an upwards swipe gesture on 3D icon 100 may cause 3D icon 100 to rotate in the direction and with a velocity associated with the swipe gesture. Similarly, a detected mouse click while a cursor is placed over 3D icon 100 followed by an upward movement of the mouse may cause a corresponding rotation of 3D icon 100 that is determined based on the direction of the mouse movement as well as the speed or distance the mouse is moved. Specifically, rotating 3D icon 100 in response to user input may include updating a render frustum or camera position within the corresponding point cloud or 3D image file based on the direction and magnitude of the input, and presenting or rendering the data points of the point cloud or 3D image file from the updated render position.

As shown in FIG. 1, user input that rotates (at 102) 3D icon 100 to the left may change the visualization of 3D icon 100 to present the second set of data points in the foreground. Similarly, user input that rotates (at 104) 3D icon 100 to the right may change the visualization of 3D icon 100 to present the third set of data points in the foreground.

In some embodiments, the same 3D rendering effects may be applied to a 3D wallpaper or image. The 3D wallpaper or image may include a high resolution 3D rendering and/or visualization that is generated from a particular camera position within the 3D space of a point cloud or other 3D image file. The device on which the 3D wallpaper or image is displayed may rotate or move. The 3D GUI may apply a rotation or movement provided based on user input or other interaction to the position of the camera within the point cloud or other 3D image file, and may render the 3D wallpaper or image from the updated position of the camera. Accordingly, the 3D GUI continues rendering the same point cloud or 3D image albeit from different positions that are determined from different rotations or movements of the device.

Different executable functionality may be associated with the different sets of data points forming 3D icon 100, and may be invoked when user input is applied over each set of data points. For instance, the data points within each particular set may be encoded with or linked to a function call, application programming interface ("API") call, system call, executable script, and/or other computer code such that when particular input (e.g., a tap, double click, selection, etc.) is directed over or to any data point of the particular data point set, the corresponding function, call, or code may be executed.

Accordingly, tapping, double clicking, or otherwise selecting (at 106) the closed trash can image when the first set of data points are displayed frontmost in 3D icon 100 may cause a recycle bin application or function associated with 3D icon 100 to open and present recently deleted files or folders. Tapping, double clicking, or otherwise selecting (at 108) the restore trash can image when the second set of data points are displayed frontmost in 3D icon 100 may cause the recycle bin application to restore the recently deleted files or folders. Tapping, double clicking, or otherwise selecting (at 110) the empty trash can image when the third set of data points are displayed frontmost in 3D icon 100 may cause the recycle bin application to permanently delete the recently deleted files or folders. Tapping, double clicking, or otherwise selecting the open folder image when the fourth set of data points are displayed frontmost in 3D icon 100 may cause the 3D GUI to change 3D icon 100 and render a new point cloud that presents visual information for one or more of the recently deleted files or folders within the recycle bin application. Accordingly, different positions or different sets of data points within the same point cloud or 3D image file used to render 3D icon 100 may be associated with and used to access different functionality.

In some embodiments, the 3D GUI may rotate 3D icon 100 in response to a rule that controls the rotation and/or movement of 3D icon 100 when there is no sensor output, actions, events, or input being directed to 3D icon 100. For instance, the rule may be defined to create a non-stationary icon so that visual information from all sides of 3D icon 100 are visible even when the device is not rotated or moved.

Figure 2:
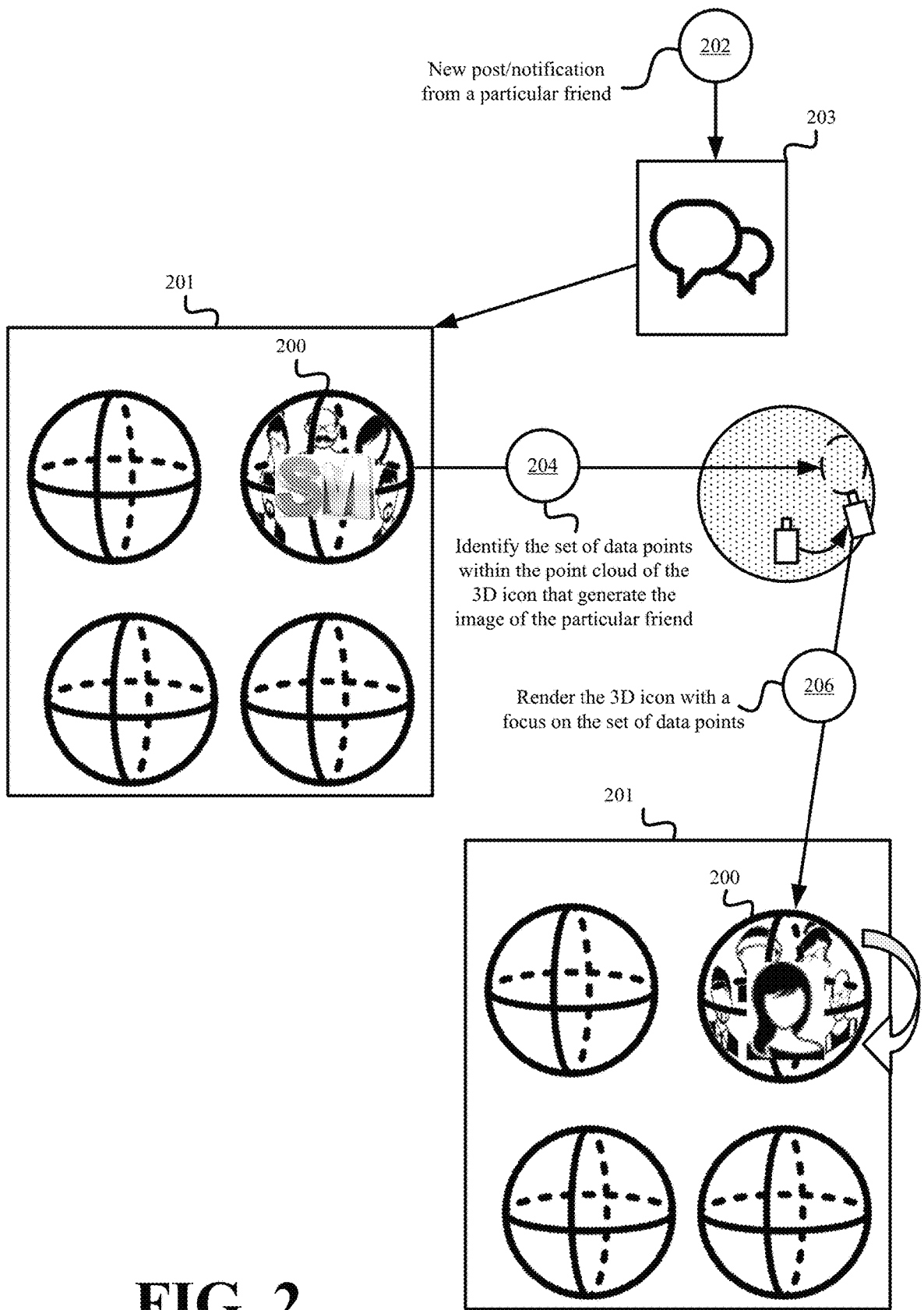
FIG. 2 illustrates an example of dynamically manipulating a 3D icon in response to different conditions or events and in accordance with some embodiments presented herein.

FIG. 2 illustrates an example of dynamically manipulating 3D icon 200 in response to different conditions or events and in accordance with some embodiments presented herein. 3D GUI 201 may detect (at 202) a condition or event that is directed to 3D icon 200 or application 203 that is accessed using 3D icon 200. 3D icon 200 may be generated from rendering a plurality of data points that are defined with positional (e.g., x, y, and z coordinate values) and non-positional elements (e.g., red, blue, green, chrominance, luminance, translucence, and/or other descriptive characteristics) in a point cloud or another 3D file format. 3D icon 200 may be used to launch social media application 203. Social media application 203 may receive a new post or notification while running in the background, via a push notification, periodic updating, and/or other updates. Social media application 203 may notify or otherwise message 3D GUI 201 of the new post or notification.

Rather than add a badge to identify the new post or notification as is done for 2D icons, 3D icon 200 may be associated with different rules that specify different 3D rotations, movements, or other manipulations of 3D icon 200 in response to the different conditions or events. As shown in FIG. 2, 3D icon 200 may include a 3D image that includes the faces or photographs of different friends or contacts within social media application 203. 3D GUI 201 may identify (at 204) the set of data points, that are linked to or correspond to the image of the particular friend, within the point cloud or 3D image from which 3D icon 200 is generated, and may render (at 206) the point cloud or 3D image file to center on the set of data points. Other data points for images of other friends or contacts that fall within the render frustrum may also be rendered in the sides or background of 3D icon 200. In some embodiments, 3D GUI 201 may gradually adjust the render position within the point cloud or 3D image file to move from a last render position to the position and orientation that is centered on and in front of the set of data points representing the image of the particular friend. In so doing, 3D GUI 201 may generate (at 206) a 3D animation effect that rotates 3D icon 200 to the image of the particular friend and that zooms in on the image of the particular friend so that the face or photograph of the particular friend becomes the focus of 3D icon 200 and consumes a larger portion of 3D icon 200.

In response to new or unread posts from multiple friends, 3D icon 200 may rotate back and forth and/or zoom in and out between the faces or photographs of each friend with a new or unread post. In contrast to an animated 2D icon that may switch between different images, 3D icon 200 is a single 3D image created from a single point cloud or 3D image file format, and the associated movements may include moving to and presenting visual information from different parts within that single 3D image or 3D icon 200.

Figure 3:
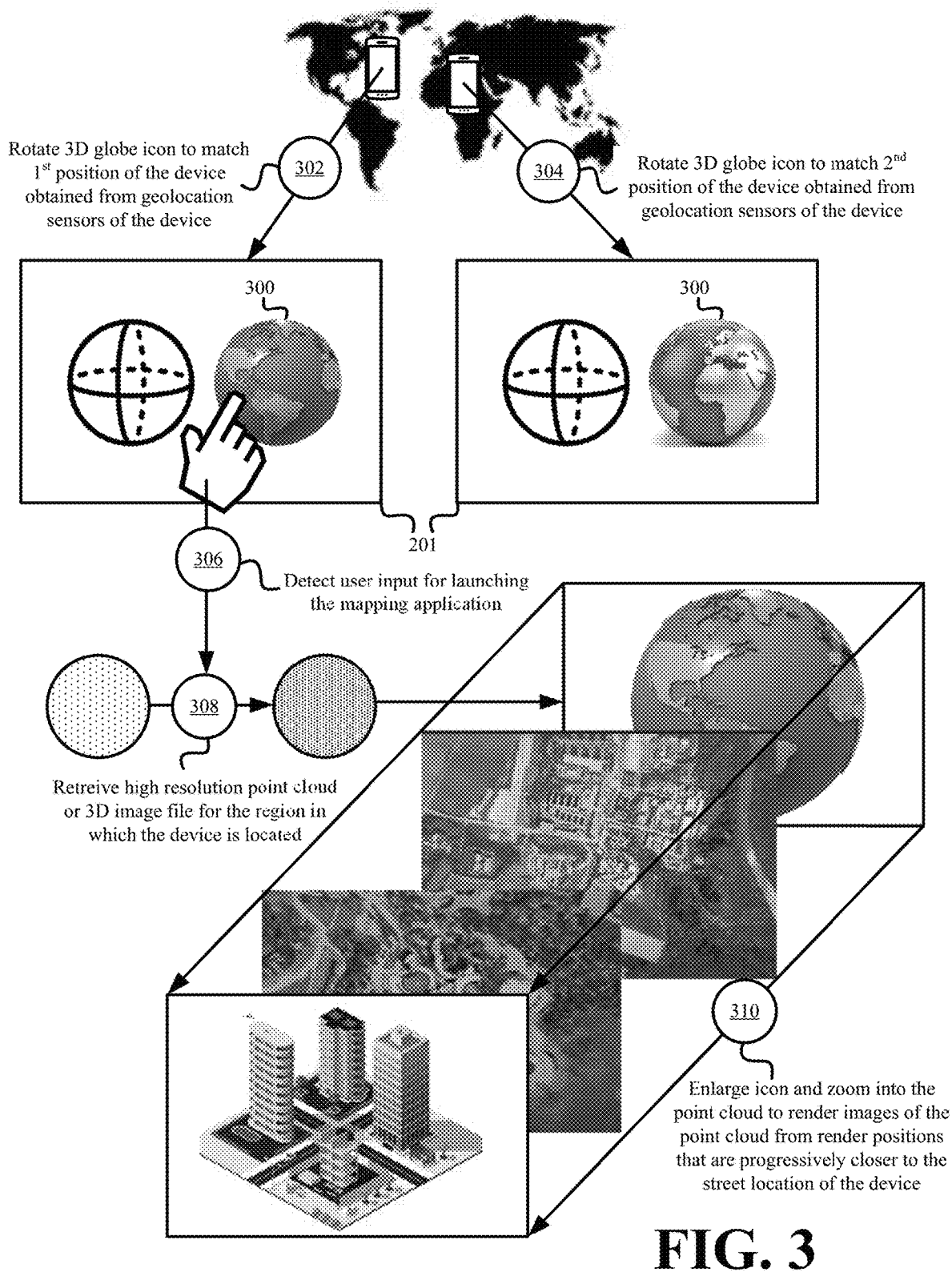
FIG. 3 illustrates an example of launching an application using a 3D icon in accordance with some embodiments presented herein.

FIG. 3 illustrates an example of launching an application using 3D icon 300 in accordance with some embodiments presented herein. 3D icon 300 may be used to launch or access a mapping application. 3D icon 300 may be a 3D image of the Earth or a globe that may be generated from a first low resolution point cloud or 3D image file of the Earth or globe. Specifically, 3D icon 300 may be generated from rendering the data points of the first low resolution point cloud or 3D image file from a first distant position.

3D GUI 201 may rotate (at 302 and 304) 3D icon 300 based on positional data received from a Global Positioning System ("GPS") sensor and/or other geolocational services of the device. For instance, 3D GUI 201 may rotate (at 302) 3D icon 300 to center on a first detected position of the device, and may rotate (304) 3D icon 300 to center on a second detected position of the device. In some embodiments, 3D icon 300 may rotate and zoom in to show the particular state or city in which the device is located with at the first resolution of the point cloud or 3D image file.

3D GUI 201 may detect (at 306) user input that launches the mapping application. For instance, user input may include a touch, tap, or other gesture applied to or over 3D icon 300.

Launching the mapping application may include retrieving (at 308) a second high resolution point cloud or 3D image file for 3D icon 300. In some embodiments, the second high resolution point cloud or 3D image file may include more data points for representing the Earth or globe than the first low resolution point cloud or 3D image file. In some embodiments, 3D GUI 201 may select between different point clouds that are high resolution scans of different countries, states, or regions based on the current position of the device.

Launching the mapping application may further include performing (at 310) a first 3D zoom effect in which 3D icon 300 is enlarged and shown from a closer vantage point that occupies all or most of the display, and/or performing (at 310) a second 3D zoom effect in which the 3D image zooms in from the faraway view of the Earth or globe to the exact street, block, or address where the device is located. Specifically, 3D GUI 201 may perform (at 310) the zoom effects by enlarging 3D icon 300 and rendering different images of the second high resolution point cloud as the render position moves progressively closer inside the second high resolution point cloud to the street location of the device. The 3D effect created by 3D GUI 201 launching the mapping application associated with 3D icon 300 is not generated by switching between different 2D image files. Instead, the 3D effect is generated by moving within a point cloud to present different visual information contained therein.

Figure 4:
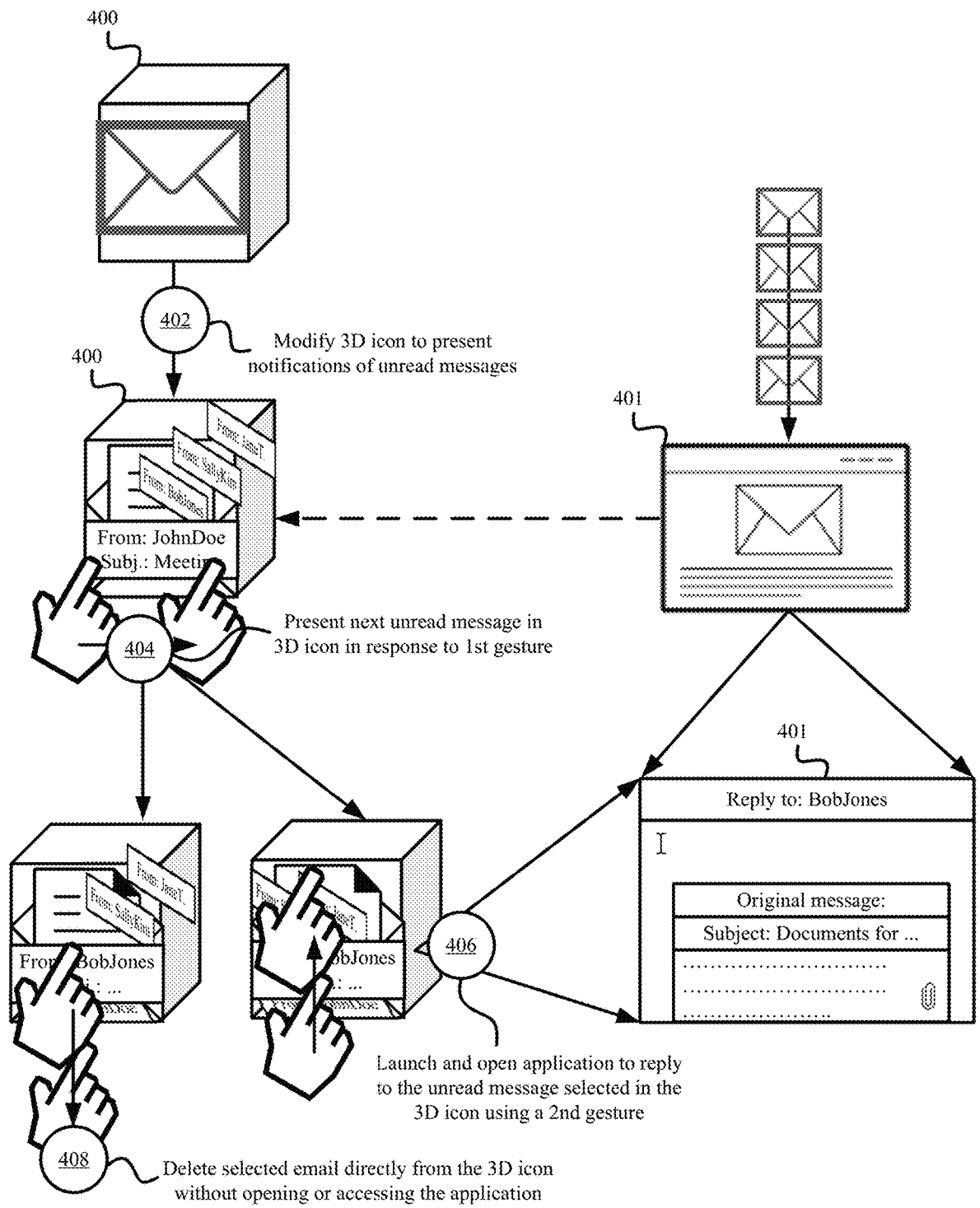
FIG. 4 illustrates an example of using different gestures to access different information from a 3D icon in accordance with some embodiments presented herein.

FIG. 4 illustrates an example of using different gestures to access different information from a 3D icon in accordance with some embodiments presented herein. As shown in FIG. 4, 3D icon 400 may include a GUI element for accessing or opening email application 401.

The 3D GUI may dynamically update 3D icon 400 to layer visual information related to different unread emails in the 3D space represented by 3D icon 400. For instance, the 3D GUI may dynamically modify (at 402) 3D icon 400 to identify new unread emails that have arrived from different senders, and may layer, stagger, or otherwise arrange the notifications for each email in the 3D space of 3D icon 400. 3D icon 400 may be updated to present the sender information and/or subject line from a most recently received unread email or message. Specifically, as each unread message notification is received by the device, 3D GUI, or email application 401, the 3D GUI may modify the point cloud or 3D image file used to create 3D icon 400 to include a visualization for that unread message notification. In some embodiments, the 3D GUI may add or define a set of data points at a different plane within the GUI to provide a visualization for each unread message notification. In some such embodiments, 3D icon 400 may include a certain number of planes that limit the number of unread message notifications that may be presented or visualized within 3D icon 400.

Different user gestures may then be used to access different unread emails directly from 3D icon 400. For instance, a right swipe gesture applied to 3D icon 400 may cause 3D icon 400 to rotate and present (at 404) the sender information and/or subject line from the next most recently received unread email or may invoke right scroll functionality that continues to rotate between the notifications for the unread messages in 3D icon 400 until the gesture is stopped. In this manner, the user may view visual information about the unread emails without opening email application 401.

After halting the right swipe gesture on a particular email message in 3D icon 400, a different gesture may be used to open (at 406) email application 401 directly to that particular email message. For instance, an up swipe gesture while the visual information for the particular email message is displayed centrally within 3D icon 400 may cause the 3D GUI to open email application 401 and invoke the email reply function so that email application 401 opens directly to a screen in which the user may enter text for a reply message to the particular email message. More specifically, the 3D GUI may determine which set of data points are presented frontmost or centrally within 3D icon 400 when the up swipe gesture is issued, may determine the particular email message that is associated with or linked to the set of data points, may determine the command or function (e.g., reply message function) that is mapped to the up swipe gesture and 3D icon 400, and may perform the command or function with the particular email message specified as a variable to open email application 401 directly to the reply message interface for the particular email message.

Similarly, a down swipe gesture applied over 3D icon 400 while the particular email message is centered within 3D icon 400 may invoke (at 408) a delete or archive email function of email application 401 directly from 3D icon 400 without opening, launching, and/or directly accessing email application 401. In other words, the user may delete, archive, or invoke other functions or operations of email application 401 on specific emails based on gestures or inputs provided directly to 3D icon 400 while email application 401 remains in a closed, minimized, inactive, sleep, and/or unopened state. Once again, the 3D GUI may determine which set of data points are presented frontmost or centrally within 3D icon 400 when the down swipe gesture is issued, may determine the particular email message that is associated with or linked to the set of data points, may determine the command or function (e.g., delete message function) that is mapped to the down swipe gesture and 3D icon 400, and may perform the command or function with the particular email message specified as a variable to delete the particular email message.

Similar functionality and/or operations of other applications may be invoked for other applications in a closed, minimized, inactive, sleep, and/or unopened state based on gestures or user inputs provided to 3D icons of those applications, and based on a mapping of the application functions to different gestures applied to the corresponding 3D icons. For instance, a user may discard or mark social media posts or text messages as read based on different gestures applied to the 3D icon for the associated social media application or text messaging application while the 3D icon is rotated to and/or centered on those social media posts or text messages, may delete, edit, or share photographs based on different gestures applied to the 3D icon for a closed, minimized, inactive, sleep, and/or unopened camera or photograph viewing application while the 3D icon is rotated to and/or centered on those photographs, and/or may receive, send, accept, or decline payments based on different gestures applied to the 3D icon for a closed, minimized, inactive, sleep, and/or unopened payment application while the 3D icon is rotated to and/or centered on notifications regarding those payments.

In some embodiments, the 3D GUI elements may include 3D emojis. A 3D emoji may include a 3D image that is generated from the positional data and non-positional data of different points defined within a point cloud. Rules may be defined for the 3D emoji and/or different data points of the 3D emoji to automatically modify the 3D emoji in response to different detected events, conditions, messages, and/or inputs.

Figure 5:
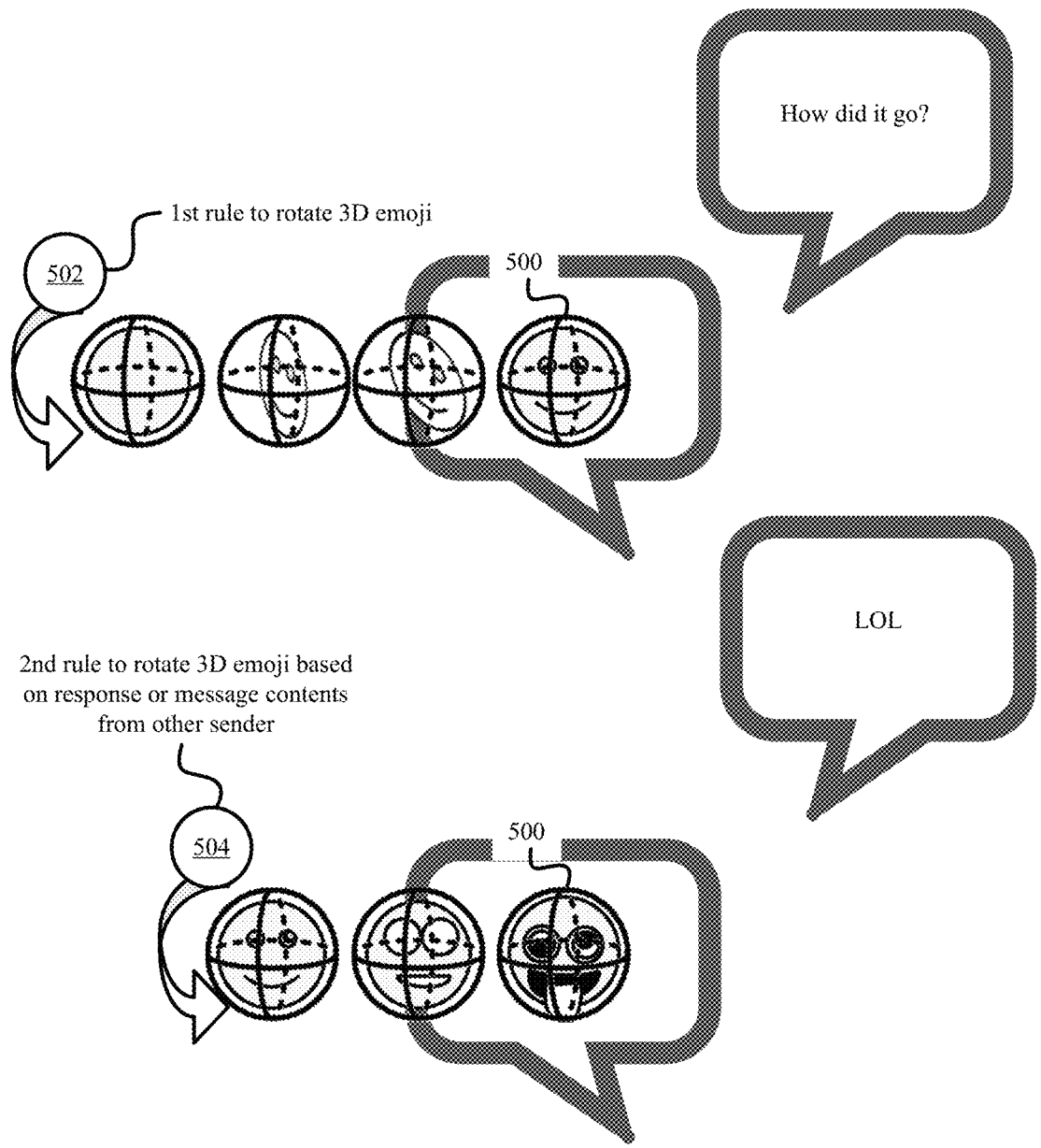
FIG. 5 illustrates an example of dynamically manipulating a 3D emoji based on different user input and/or different rules associated with the 3D emoji in accordance with some embodiments presented herein.

FIG. 5 illustrates an example of dynamically manipulating 3D emoji 500 based on different user input and/or different rules associated with the 3D emoji in accordance with some embodiments presented herein. 3D emoji 500 may be sent in a message exchange between two or more users. For instance, 3D emoji 500 may be sent by a first user in response to a text message, social media post, shared image, or other content sent by a second user.

A first rule associated with 3D emoji 500 may define and generate (at 502) a first set of rotations or movements to apply to 3D emoji 500 when presenting 3D emoji 500 to the second user. The first set of rotations or movements may include rendering the point cloud or data points associated with 3D emoji 500 from a first set of positions as specified by the first rule.

A second rule associated with 3D emoji 500 may define and generate (at 504) a second set of rotations, movements, and/or 3D effects to apply to 3D emoji 500 based on a response provided by the second user after being presented with 3D emoji 500 and the first set of rotations or movements. For instance, the second user may respond with a message that includes the phrase "LOL", and the phrase may be a keyword that is tied to a rule that triggers the second set of rotations, movements, and/or 3D effects. The second set of rotations, movements, and/or 3D effects may include adjusting the positioning of the point cloud data points to create the 3D effect illustrated in FIG. 5.

In some embodiments, the 3D GUI elements may replace 2D buttons, menus, sliders, and/or other 2D GUI elements within an open, active, or frontmost application. In some such embodiments, a single 3D GUI element may be used to replace and/or invoke the functionality associated with multiple 2D buttons, menu items, sliders, and/or 2D GUI elements.

Figure 6:
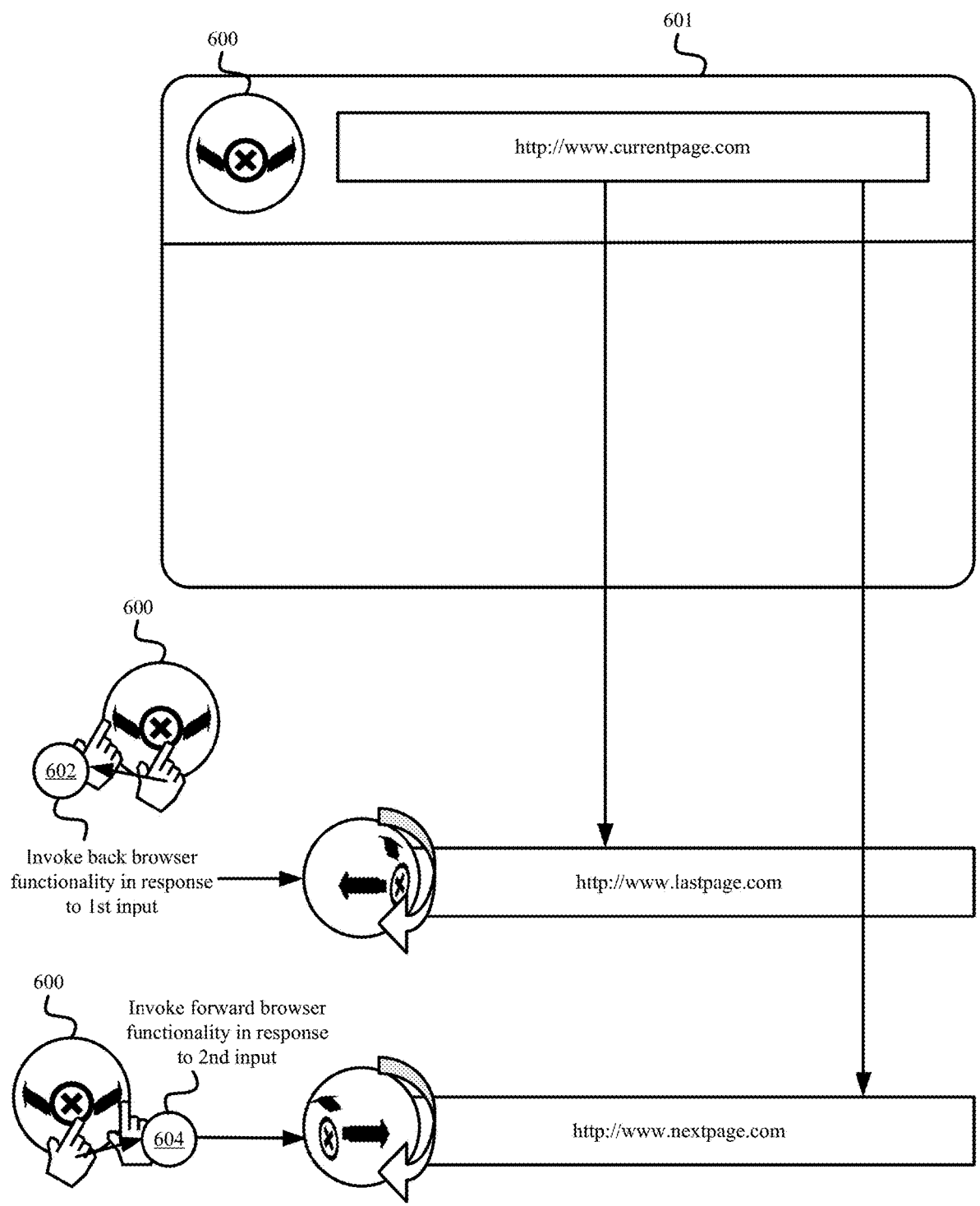
FIG. 6 illustrates an example of a 3D GUI element for invoking different functionality within an open, active, or frontmost application in accordance with some embodiments presented herein.

FIG. 6 illustrates an example of 3D GUI element 600 for invoking different functionality within an open, active, or frontmost application 601 in accordance with some embodiments presented herein. 3D GUI element 600 may be a single interactive element that replaces the back, forward, and stop elements of web browser application 601. In some embodiments, 3D GUI element 600 may be a single interactive element that replaces the fast forward, rewind, and stop elements of a media player application and/or that controls other operations of other applications.

3D GUI element 600 may include a 3D image that is generated from rendering a single point cloud or other 3D image file from a first 3D position. Specifically, 3D GUI element 600 may present first visual information when the point cloud is rendered from the first 3D position as a result of no user input being applied to 3D GUI element 600.

The 3D GUI associated with application 601 may detect first user input that is applied to 3D GUI element 600 and that invokes the browser back button functionality. For instance, the first user input may include a left swipe gesture.

In response to the first user input, the 3D GUI may rotate (at 602) 3D GUI element 600 to present second visual information that indicates invocation of the browser back functionality. Specifically, the first user input may trigger a first rule that causes the 3D GUI to render the point cloud from a second position at which the second visual information is visible. Additionally, browser application 601 may retrieve and display the last accessed site in the browser history in response to the invocation of the browser back button functionality.

The 3D GUI may detect second user input that is applied to 3D GUI element 600 and that invokes the browser forward functionality. For instance, the second user input may include right swipe gesture.

In response to the second user input, the 3D GUI may rotate (at 604) 3D GUI element 600 to present third visual information that indicates invocation of the browser forward functionality. Specifically, the second user input may trigger a second rule that causes the 3D GUI to render the point cloud from a third position at which the third visual information is visible. Additionally, browser application 601 may retrieve and display (at 604) next accessed site in the browser history in response to the invocation of the browser forward button functionality.

The 3D GUI may detect third user input that is applied to 3D GUI element 600 and that invokes the browser halt functionality. For instance, the third user input may include a touch and hold or tap gesture on 3D GUI element 600. In response to the third user input, the 3D GUI may cause 3D GUI element 600 to rotate back to the first visual information and to wobble the first visual information to indicate that the browser halt functionality has been invoked.

Figure 7:
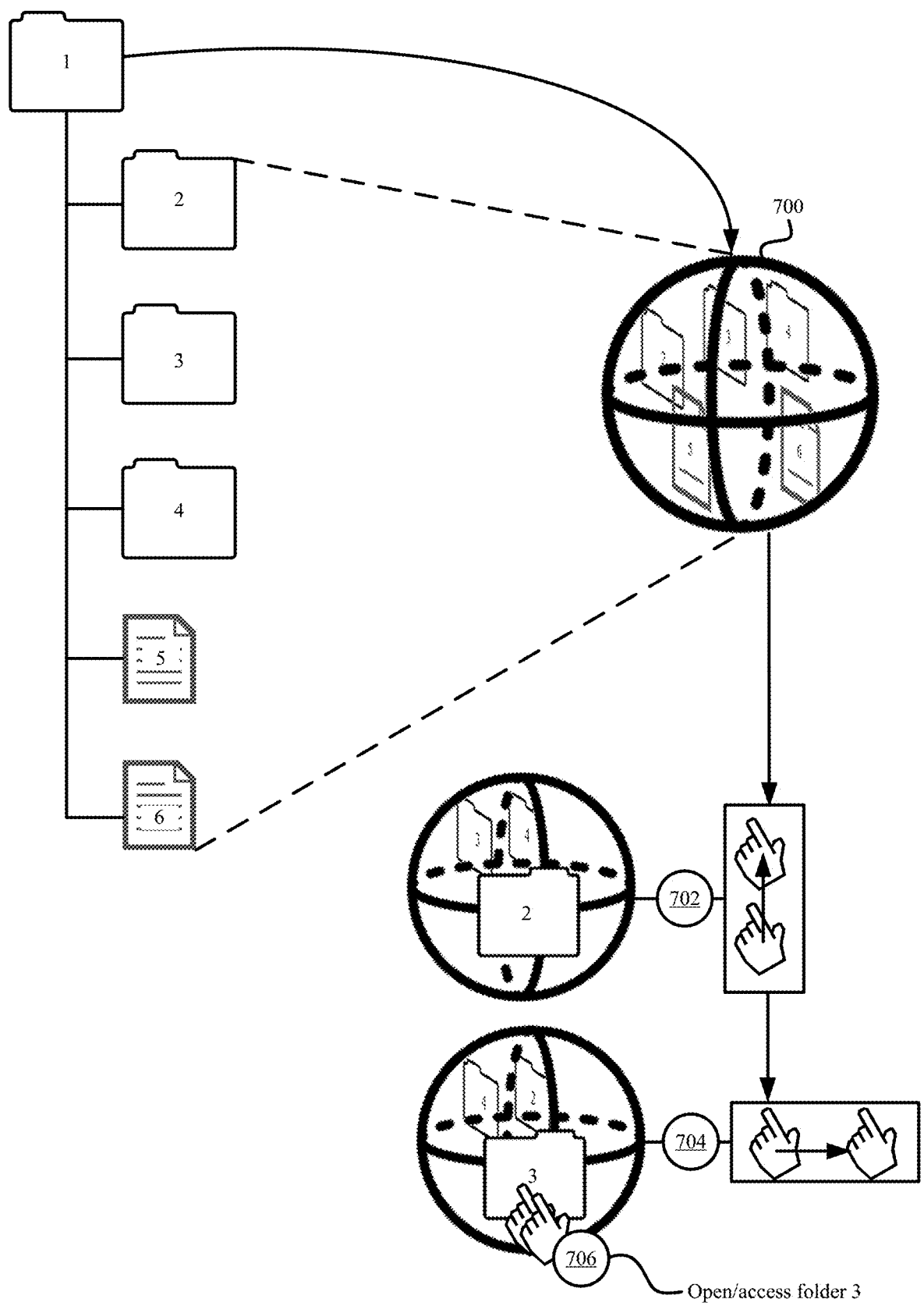
FIG. 7 illustrates an example of a 3D GUI element for controlling file system access in accordance with some embodiment presented herein.

In some embodiments, the 3D GUI elements may be used to control file system access and/or navigation through a directory structure. FIG. 7 illustrates an example of 3D GUI element 700 for controlling file system access in accordance with some embodiment presented herein.

As shown in FIG. 7, the 3D GUI may generate 3D GUI element 700 based on a point cloud or other 3D image file that graphically represents a particular folder structure. For instance, 3D GUI element 700 may include visual information for different folders or directories as well as files under a particular parent folder or directory.

First user input may rotate 3D GUI element 700 in order to expose the visual information for the different contained folders, directories, and/or files by rendering the point cloud or 3D image file from different render positions. For instance, an up swipe gesture followed by a right or left swipe gesture may be used to access and/or present (at 702 and 704) the visual information for the different folders or directories under the particular parent folder or directory. Similarly, a down swipe gesture followed by a right or left swipe gesture may be used to access and/or present the visual information for the different files under the particular parent folder or directory. The presented visual information may include the name of the folder, directory, or file, or may include an icon associated with the folder, directory, or file.

The user may access a particular folder by stopping rotation of 3D GUI element 700 when the visual information for the particular folder is presented in 3D GUI element 700. In some embodiments, the different visual information or render positions within the point cloud may be associated or linked to different folders and/or files. Accordingly, second user input may be issued with respect to 3D GUI element 700 to access (at 706) the particular folder. For instance, the second user input may include a double tap gesture when the visual information for the particular folder is displayed within 3D GUI element 700.

In response to the second user input being issued when the visual information for the particular folder is displayed within 3D GUI element 700, the 3D GUI may open or access the particular folder, and/or may adjust 3D GUI element 700 to present visual information for the files or folders that are stored under the particular folder.

Other inputs or gestures may be associated with other file system commands. For instance, a two finger expand gesture performed over the visual information for a specific folder may invoke a copy command that copies the specific folder and its contents. Single finger swipe gestures and double tap gestures may then be used to navigate to a different location in the file system, and a two finger pinch gesture may paste the copied specific folder and its contents to the navigated to location within the file system. In some embodiments, a two finger tap gesture performed over the visual information for a specific folder or file may cause the 3D GUI or file system to delete that folder or file.

Figure 8:
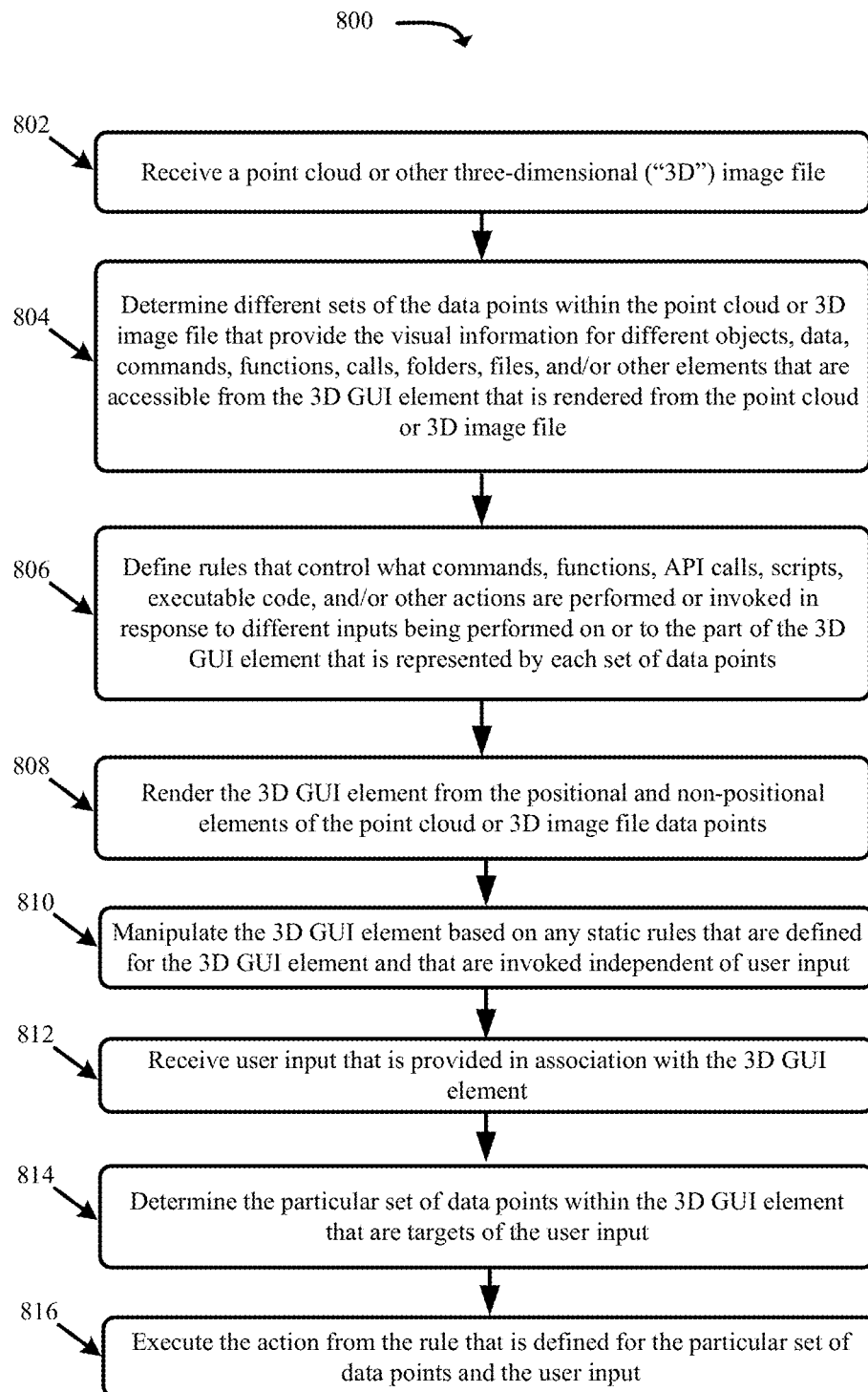
FIG. 8 presents a process for presenting and interacting with a 3D GUI element in accordance with some embodiments presented herein.

FIG. 8 presents a process 800 for presenting and interacting with a 3D GUI element in accordance with some embodiments presented herein. Process 800 may be implemented by the 3D GUI that runs on hardware resources of a user device. The 3D GUI may be implemented within the device operating system ("OS"), within different OS services (e.g., a file system), and/or within different applications running atop the OS.

Process 800 may include receiving (at 802) a point cloud or other 3D image file. The point cloud may include data points that are positioned in 3D space based on positional elements defined for each data point, and that are rendered with different visual characteristics based on different non-positional elements defined for each data point. The collective rendering of the data points from a single point cloud or 3D image file may generate a 3D icon, 3D emoji, 3D wallpaper, and/or other 3D GUI element that includes different visual information at different positions within the 3D space represented by that 3D GUI element. In some embodiments, the 3D GUI may dynamically generate the point cloud based on data associated with applications, functions, folder structures, and/or 2D GUI elements that are to be accessed from the 3D GUI element represented by the point cloud or other 3D image file.

Process 800 may include determining (at 804) different sets of the data points within the point cloud that render and/or provide the visual information for identifying different objects, data, commands, functions, API calls, folders, files, and/or 2D GUI elements that are accessible from the 3D GUI element that is generated based on the point cloud or 3D image file data points. In some embodiments, the different sets of data points may be tagged to identify what they represent. For instance, a first set of data points within a point cloud may include a non-positional element with a "Browser Back" value, a second set of data points within the point cloud may include the value "Browser Forward" for the non-positional element, and a third set of data points within the point cloud may include the value "Browser Halt" for the non-positional element. In some embodiments, the 3D GUI may render the point cloud, and perform image or pattern recognition to tag the different sets of data points with different identifiers for the command, function, API call, folder, file, and/or 2D GUI element represented by that set of data points.

Process 800 may include defining (at 806) rules that control what commands, functions, API calls, scripts, executable code, and/or other actions are performed or invoked in response to different inputs being performed on or to the part of the 3D GUI element that is represented by each set of data points. In some embodiments, the point cloud or 3D image file may be associated with a particular application that runs on the user device, and the particular application may include an input definition that defines the rules for the application commands, functions, API calls, scripts, executable code, and/or other actions that are performed or invoked in response to the different input being applied to the visual information associated with the different sets of data points. For instance, defining (at 806) the rules may include determining a first application function to perform or call with zero or more variables when a particular swipe gesture is performed on or over a first data point set (e.g., a first set of data points) of the point cloud tagged with the "Browser Back" value, and determining a second application function to perform or call with zero or more variables when the particular swipe gesture is performed on or over a second data point set of the point cloud tagged with the "Browser Forward" value. The inputs may include touch inputs that are detected by a touch sensor on a trackpad, touchscreen, or other touch-sensitive input device. The inputs may also include mouse, keyboard, voice, and/or means with which a user may interact with and/or control the device as well as the application features and functionality. The invocable commands, functions, scripts, API calls, executable code, and/or other actions may be specified to the application that is accessed via the 3D GUI element represented by the point cloud, OS functions, system calls, and/or other non-application specific functionality supported by the application or device. The invocable output may also include rotating, manipulating, or otherwise adjusting the rendering of the point cloud to present different visual information therein or to generate various 3D effects by manipulating the positional and/or non-positional elements of the existing data points in response to certain inputs or no inputs.

Process 800 may include rendering (at 808) a 3D GUI element from the positional and non-positional elements of the point cloud or 3D image file data points, and presenting (at 810) the 3D GUI element within a 3D GUI. In some embodiments, the point cloud, 3D image file, and/or 3D GUI may define a default or starting position from which to render the data points. In some embodiments, the 3D GUI may include a GUI that is used to launch or access different functionality of different applications configured on the device. In some embodiments, the 3D GUI may include a specific GUI of an application that becomes accessible when the application is launched, active, open, and/or frontmost.

Process 800 may include manipulating (at 810) the 3D GUI element based on any static rules that are defined for the 3D GUI element and that are invoked independent of user input. For instance, manipulating (at 810) the 3D GUI element may include continuously rendering the point cloud from different render positions to simulate a 3D rotation or movement of the 3D GUI element.

Process 800 may include receiving (at 812) user input that is provided in association with the 3D GUI element. For instance, the user input may be provided when the 3D GUI element is selected, or may be provided over or on a part of the 3D GUI element.

Process 800 may include determining (at 814) the particular set of data points within the 3D GUI element that are targets of the user input. The particular set of data points may include the set of data points that are centered or frontmost on the 3D GUI element when the user input is received (at 812), or may include the set of data points that are at a position where the user input begins and/or ends.

Process 800 may include executing (at 816) the action from the rule that is defined for the particular set of data points and the user input. In some embodiments, executing (at 816) the action may include executing a command, function call, API call, script, and/or executable code of the associated application. The rule may further specify one or more variables for the executed action based on the particular set of data points. For instance, the particular set of data points may correspond to a visualization of a first email, and executing (at 816) the action may include invoking an application call that accesses, opens, and/or otherwise implicates the first email. In some embodiments, executing (at 816) the action may include adjusting the visualization of the 3D GUI element by rendering the point cloud from different render positions that center on and/or bring different sets of data points to focus or the center, and/or by changing the positional and/or non-positional elements of different data points to create various 3D effects within the 3D GUI element. Accordingly, the 3D GUI may modify the data points of the point cloud, and may store the modified point cloud to retain the current state of the 3D GUI element.

In some embodiments, the 3D icons, 3D emojis, 3D wallpapers, and/or 3D GUI elements are generated from other 3D formats or representations. For instance, a 3D GUI element may be generated based on a mesh model, and may be animated or rotated by repositioning a virtual camera or render position within the 3D space of the mesh model. A mesh model is a 3D representation of one or more objects or scenes, and is formed from a connected set of triangles, polygons, or other meshes.

Figure 9:
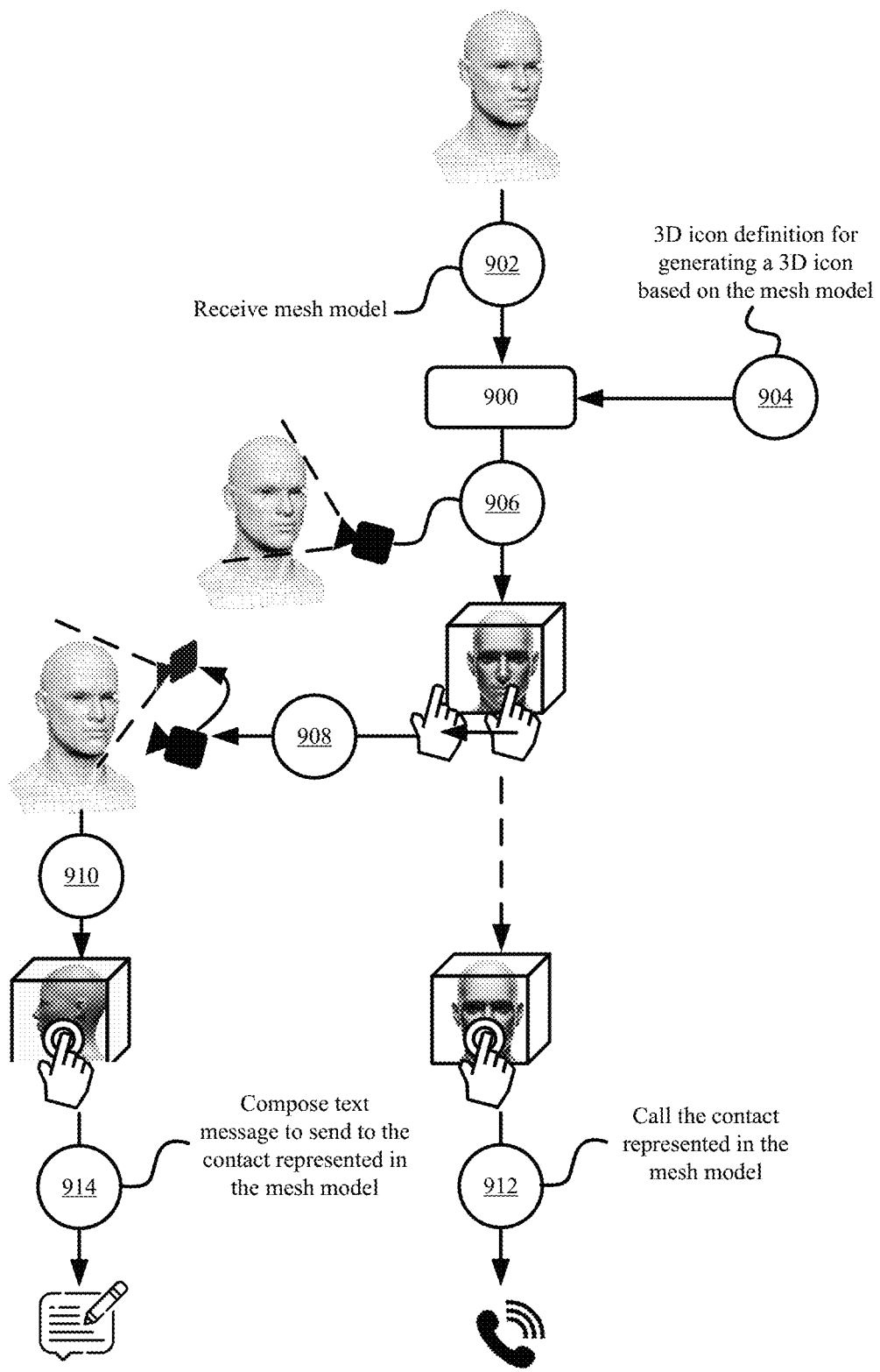
FIG. 9 illustrates an example of an interactive 3D icon that is generated from a mesh model in accordance with some embodiments presented herein.

FIG. 9 illustrates an example of an interactive 3D icon that is generated from a mesh model in accordance with some embodiments presented herein. 3D GUI system 900 receives (at 902) a mesh model. The mesh model is a representation of a 3D object or scene that is formed from a connected set of meshes (e.g., triangles, polygons, etc.).

3D GUI system 900 obtains (at 904) a 3D icon definition that links to the mesh model. For example, a messaging application may be associated with the 3D icon definition, and may reference the 3D icon definition to generate a 3D icon with a 3D representation of a particular contact in order to notify the user of a message that is received from the particular contact. In this example, the received (at 902) is the 3D representation of the particular contact. The 3D icon definition may specify or may be associated with a default or last render position for the mesh model. The render position determines the field-of-view within the 3D space of the mesh model, and specifies what parts or which meshes of the mesh model are presented as part of the 3D icon. For instance, the render position may be about a left side of the mesh model which causes meshes about the left side of the mesh model to be presented at the center of the 3D icon. The 3D icon definition may also associate different functionality to different parts of the mesh model.

3D GUI system 900 generates (at 906) the 3D icon by rendering the set of meshes from the mesh model that are in the field-of-view that is created from the render position. 3D GUI system 900 tracks swipe gestures that are applied to the 3D icon, and changes (at 908) the render position in the mesh model according to the tracked swipe gestures. For instance, in response to tracking a leftward swipe gesture, 3D GUI system 900 moves the render position to a left side of the mesh model. The distance between the render position and the mesh in the mesh model may not change as a result of the leftward swipe gesture. 3D GUI system 900 animates (at 910) the 3D icon by updating the 3D icon to present different sets of meshes that are within the different field-of-view of the render position moving from a first position to a second position in the 3D space of the mesh model as a result of the render position changing in response to the leftward swipe gesture.

In some embodiments, 3D GUI system 900 increases the distance between the render position and the meshes in the mesh model in response to a pinch gesture that is applied to the 3D icon, and decreases the distance between the render position and the meshes in the model in response to a two-finger spread or widening gesture. 3D GUI system 900 animates the 3D icon in response to the pinch and spread gestures and the changing of the render position. For instance, the spread gesture causes the 3D GUI system 900 to zoom into the mesh model, and present the 3D icon with a closer view of a smaller subset of meshes that the render position zooms in on.

The 3D icon definition may also associate different rules to different set meshes of the mesh model. Each rule specifies a function or action that is performed in response to a particular input that is applied over one or more of a specific set of meshes that are associated with that rule. For instance, a first set of meshes from the mesh model may be associated with a first rules that invokes a first function of a particular application when a particular gesture is performed on or over one or more of the first set of meshes. A second set of meshes from the mesh model may be associated with a second rule that invokes a second function of the particular application when the particular gesture or another gesture is performed on or over one or more of the second set of meshes. In some embodiments, the first set of meshes may be defined with a pointer or other identifier to the first rule, and the second set of meshes may be defined with a pointer or other identifier to the second rule.

FIG. 9 illustrates 3D GUI system 900 executing (at 912) the first function in response to a user input being applied to or over one or more of the first set of meshes. Specifically, 3D GUI system 900 determines that the user action is performed on the 3D icon when the 3D icon is rendered with the first set of meshes. The user action may include a touch gesture or an input that is provided using a keyboard, mouse, or other input device. 3D GUI system 900 retrieves the first rule that is associated with the first set of meshes, and determines that the user action is defined in the first rule as the particular gesture for invoking the first function. For instance, the first rule may specify invoking the first function in response to a double tap action that is performed over any one or more of the first set of meshes, and the provided user action is the double tap action. Executing the first function may include performing an API call, system call, executable script, and/or other computer code. For instance, executing (at 912) the first function may include calling the particular contact that is represented in the mesh model.

3D GUI system 900 may also execute (at 914) the second function in response to the particular gesture being applied to or over one or more of the second set of meshes. In this example, executing (at 914) the second function may include composing a text message to the particular contact that is represented in the mesh model. Accordingly, the 3D icon may be associated with a communication application that performs calling and messaging operations, or the first rule may invoke a function of a calling application and the second rule may invoke a function of a different messaging application on the user device. 3D GUI system 900 may generate the 3D icon in response to receiving a message from the particular contact, and may provide the 3D icon to notify the user of the message from the particular contact and/or different means with which to respond to the particular contact.

Multiple rules may be associated with the same set of meshes in a mesh model and/or the definition of a 3D icon, and may be used to invoke different functionality in response to different user actions that are performed when the 3D icon presents the set of meshes. For instance, a particular set of meshes in a mesh model may be associated with a first rule for deleting a file when a first user action (e.g., a downward swipe) is applied to the particular set of meshes, and may be associated with a second rule for opening a file when a second user action (e.g., an upward swipe) is applied to the particular set of meshes.

The different rules may be associated with different sets of meshes from a mesh model that is used for generating any of a 3D icon, 3D emoji, 3D wallpaper, and/or 3D GUI element. For instance, 3D GUI system 900 may generate a 3D menu item based on the mesh model, and may execute a first function when a first user action is performed when the 3D menu item presents a first set of meshes from the mesh model, a second function when a second user action is performed when the 3D menu item presents the first set of meshes, and a third function when the first user action is performed when the 3D menu item is rotated to present a second set of meshes from the mesh model.

Figure 10:
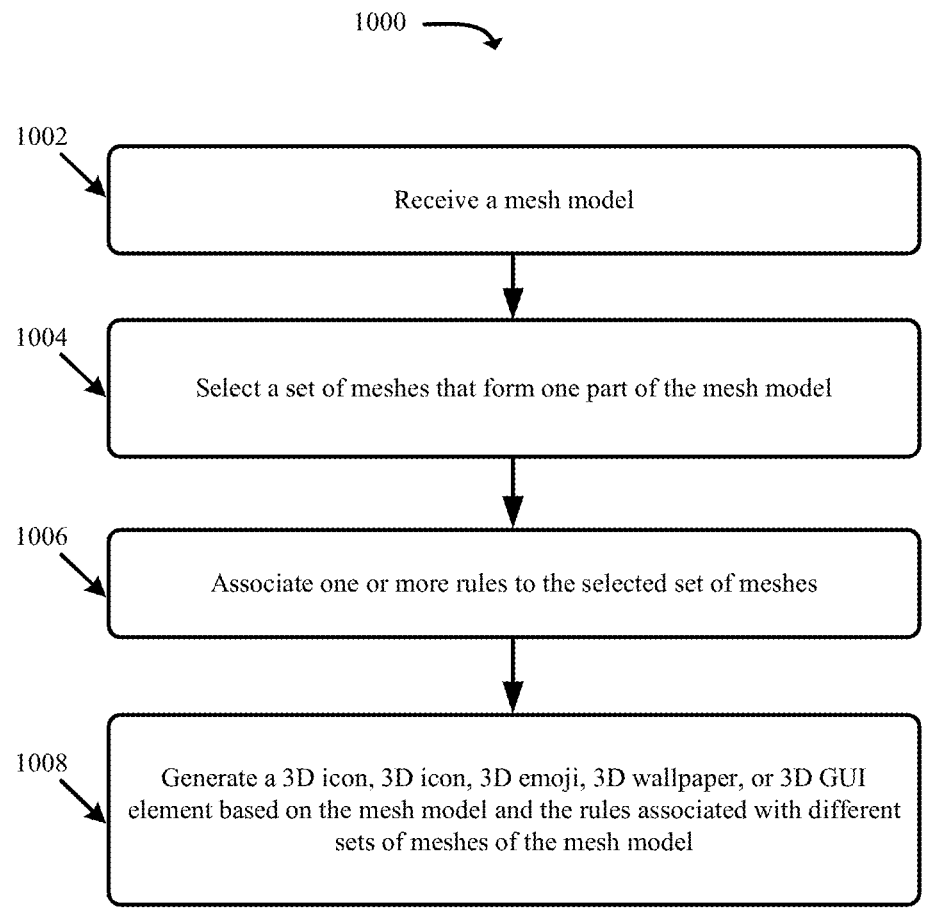
FIG. 10 presents a process for defining 3D icons, 3D emojis, 3D wallpapers, and/or other 3D GUI elements based on mesh models in accordance with some embodiments presented herein.

FIG. 10 presents a process 1000 for defining 3D icons, 3D emojis, 3D wallpapers, and/or other 3D GUI elements based on mesh models in accordance with some embodiments presented herein. Process 1000 may be implemented by 3D GUI system 900. In some embodiments, 3D GUI system 900 runs on hardware resources of a computer system, and/or is part of the computer system OS, different OS services, and/or applications running atop the OS to create a 3D GUI for the OS or for applications running on the computer system.

Process 1000 includes receiving (at 1002) a mesh model. The mesh model is defined with polygons or other meshes that are distributed across a 3D space to form a digital 3D representation of one or more objects or scenes. Each mesh may be connected to one or more other meshes of the mesh model about vertices of the meshes, thereby creating the continuous or connected form of the objects or scenes. In some embodiments, the mesh model is generated from a 3D scanning of the represented objects or scenes. In some other embodiments, the mesh model is digitally created via 3D graphics tools.

Process 1000 includes selecting (at 1004) a set of meshes that form one part of the mesh model. The selection (at 1004) may include using a lasso, marquee, or other selection tool to choose the set of meshes from all meshes of the mesh model. For instance, a left region or volume of the mesh model that includes the set of meshes may be selected (at 1004). The selection (at 1004) may also be made programmatically or via a selection process. For instance, the mesh model may be partitioned into six equal sized voxels or volumes that include different sets of meshes that form the left, right, front, back, top, and bottom sides of the represented 3D object.

Process 1000 includes associating (at 1006) one or more rules to the selected (at 1004) set of meshes. Associating (at 1006) a rule to the selected (at 1004) set of meshes includes linking the rule to the selected (at 1004) set of meshes, defining an action that invokes the rule, and defining a function that is performed in response to the rule being invoked. For instance, each mesh of the selected (at 1004) set of meshes may include a non-positional element that is defined with an identifier or link to each rule that is associated (at 1006) with the selected (at 1004) set of meshes. Accordingly, when a user input is provided or applied to one or more meshes of the selected (at 1004) set of meshes, 3D GUI system 900 retrieves the rules associated (at 1006) with the one or more meshes based on the identifiers or links defined in the non-positional element of the one or more meshes. 3D GUI system 900 then determines if the user input matches the action that is defined for invoking any of the associated rules. For instance, each rule is defined with one or more user actions or inputs that invoke the rule. The inputs may include different touch inputs, keyboard inputs, mouse inputs, virtual, mixed, or augmented reality inputs, and/or inputs from other sensors or devices. In some embodiments, the inputs are defined as commands or calls issued by a user when interacting with the 3D GUI. In response to the user input matching the action that is defined for invoking a particular associated rule, 3D GUI system 900 invokes the particular associated rule by executing the function that is defined for that particular associated rule. The function may perform any computer-executable action including executing API calls, system calls, executable scripts, application functions, and/or other computer code.

Rules may be associated (at 1006) with different sets of meshes that form different parts of the mesh model. For instance, a user selects (at 1004) a new set of meshes and associates (at 1006) new rules to the current selection, and continues until different controls are associated with different parts of the mesh model. In this manner, different parts of the mesh model (e.g., different sets of meshes) may be defined and/or associated with rules that perform different actions in response to the same or different user inputs being applied to or over those different parts of the mesh model.

Process 1000 includes generating (at 1008) a 3D icon, 3D emoji, 3D wallpaper, or 3D GUI element based on the mesh model and the rules associated (at 1006) with different sets of meshes of the mesh model. Generating (at 1008) the 3D icon, 3D icon, 3D emoji, 3D wallpaper, or 3D GUI element may include specifying a definition that links the mesh model with the associated (at 1006) rules to the 3D GUI element, and that sets a default or last tracked render position within the mesh model. In some embodiments, the definition contains the mesh model data. In any case, 3D GUI system 900 or an OS that controls the 3D GUI references the definitions in order to generate the 3D GUI elements of the 3D GUI with each definition identifying the mesh model or point cloud that contains the 3D image data for that 3D GUI element, and with different sets of meshes or points from the mesh model or point cloud being associated with different rules that control the 3D GUI element function.

A field-of-view is created from the render position, and determines the set of meshes and the perspective from which the set of meshes are rendered in the 3D GUI element. In other words, the render position establishes the meshes that are rendered to present the front, sides, top, and bottom of the 3D GUI element.

The render position may be changed in response to user input. Changing the render position includes animating the 3D GUI element and/or changing the meshes that are rendered at the front, sides, top, bottom, and/or other positions of the 3D GUI element.

Accordingly, generating (at 1008) a 3D icon includes rendering a first set of meshes from the mesh model that are associated with a first set of rules at the center or front of the 3D icon, and other sets of meshes that are associated with other sets of rules and that surround the first set of meshes to fill in other parts of the 3D icon.

Generating (at 1008) the 3D icon further includes tracking where user input is applied in relation to the 3D icon. Specifically, 3D GUI system 900 determines the position at which user input is applied on the 3D icon, determines the set of meshes that are rendered at that position, and determines if the user input invokes any rules that are associated with the set of meshes at the position.

In some embodiments, 3D GUI system 900 dynamically generates or modifies a mesh model for a 3D icon or 3D GUI element based on notifications or outputs of a linked application. For instance, 3D GUI system 900 may provide a 3D icon to control different functionality of a particular application when the particular application is a closed, minimized, inactive, sleep, and/or unopened state. The particular application may have one or more services or processes that run in the background and that generate notifications. 3D GUI system 900 may dynamically modify the mesh model that is used to generate the 3D icon in order to present the notifications on the 3D icon. The notifications may alert a user as to new incoming messages, reminders, and/or provide information, news, and/or other updates.

In some such embodiments, 3D GUI system 900 may modify the meshes of the mesh model to present each notification or a representation for the notification in a different region of the mesh model. For instance, 3D GUI system 900 may modify the meshes to include meshes that present text from the notification and/or that present an image or symbol for the notification. Additionally, 3D GUI system 900 may rotate the 3D icon or change the render position within the modified mesh model to render the modified meshes that present a newly received notification or the representation for that notification. 3D GUI system 900 may automatically associate rules to the modified meshes based on the notification type. For instance, in response to the particular application receiving a new email while the particular application is in a closed state, 3D GUI system 900 may modify the meshes of the mesh model used to generate the 3D icon for the particular application so that the 3D icon presents a notification for the new email. 3D GUI system 900 may also associate a set of rules to the modified meshes that allow a user to open the new email with a first action, delete the email with a second action, and reply to the new email with a third action.

In some embodiments, 3D GUI system 900 synchronizes the presentation of the 3D GUI elements and/or the 3D GUI containing the 3D GUI elements across multiple displays. For instance, multiple users may access a common 3D environment with 3D icons using different devices (e.g., different virtual, mixed, or augmented reality devices), and the interaction of one user with a 3D icon may be synchronized and displayed for all users accessing the common 3D environment.

Figure 11:
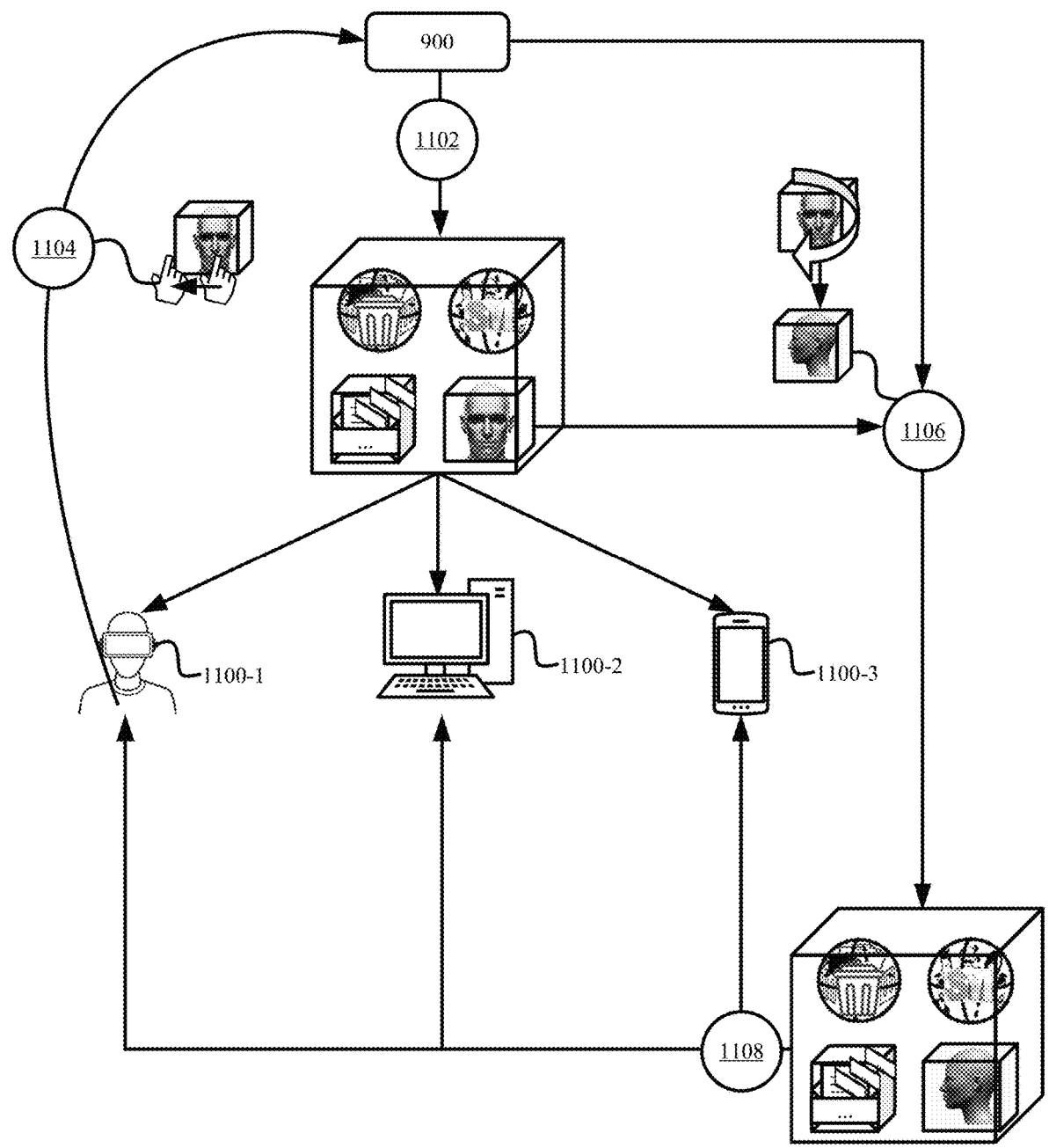
FIG. 11 illustrates an example of synchronizing the presentation of a 3D GUI across multiple devices in accordance with some embodiments presented herein.

FIG. 11 illustrates an example of synchronizing the presentation of a 3D GUI across multiple devices in accordance with some embodiments presented herein. 3D GUI system 900 generates and distributes (at 1102) a 3D GUI to multiple user devices 1100-1, 1100-2, and 1100-3. The 3D GUI includes one or more 3D icons and/or other 3D GUI elements.

3D GUI system 900 receives (at 1104) input from first user device 1100-1. The input manipulates a 3D icon in the 3D GUI. Specifically, the input changes the render position in the point cloud or mesh model from which the 3D icon is generated, thereby causing the 3D icon to rotate and present different points or meshes in the 3D icon.

3D GUI system 900 stores the data for the point cloud or mesh model of the 3D icon, changes the render position according the inputs, and generates (at 1106) an updated visualization of the 3D icon that presents the points or meshes that are in the field-of-view of the changed render position. 3D GUI system 900 streams (at 1108) the updated visualization to user devices 1100-1, 1100-2, and 1100-3. To improve response time, 3D GUI system 900 provides the updated data for the adjusted 3D icon without providing the data for other 3D icons or 3D GUI elements of the 3D GUI.

In some embodiments, 3D GUI system 900 synchronizes the display of the 3D GUI in response to inputs that are not directly applied to the 3D GUI elements (e.g., 3D icons, 3D wallpapers, 3D menu items, etc.) of the 3D GUI. The inputs may originate from tracking the head position or eye gaze of a user, or may originate via spatial inputs provided by a user in one space that are translated or applied to another 3D space of the 3D GUI.

Figure 12:
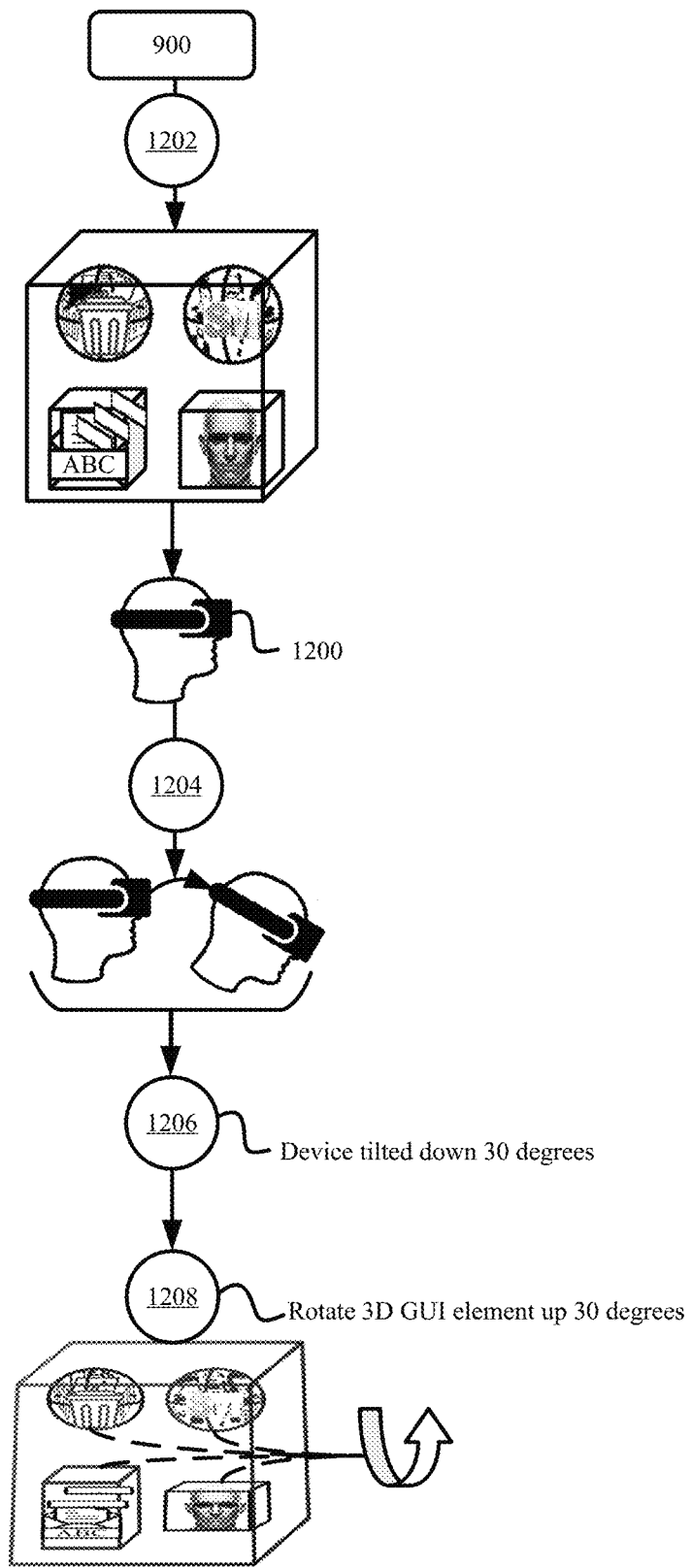
FIG. 12 illustrates an example of synchronizing the display of the 3D GUI in response to inputs that are not directly applied to the 3D GUI in accordance with some embodiments presented herein.

FIG. 12 illustrates an example of synchronizing the display of the 3D GUI in response to inputs that are not directly applied to the 3D GUI in accordance with some embodiments presented herein. 3D GUI system 900 presents (at 1202) the 3D GUI with one or more 3D GUI elements on device 1200. Device 1200 may include a virtual, mixed, or augmented reality display or headset, or another device with sensors that track movement, rotation, tilt, and/or orientation of the device. The 3D GUI elements of the 3D GUI are generated from point clouds, mesh models, or other 3D formats, and different parts of the 3D GUI elements are associated with different rules for invoking different functions or functionality from the same GUI element using different inputs or the same input applied to different parts of the 3D GUI element. Moreover, 3D GUI system 900 generates the 3D GUI elements according to a current position or orientation of device 1200 and/or eye gaze of the user. For instance, if device 1200 is angled straight or level, then 3D GUI system 900 aligns the render position in the mesh models or point clouds of the 3D GUI elements with the position of device 1200 so that the 3D GUI elements are rendered at the same angle or level as the position of device 1200.

3D GUI system 900 receives (at 1204) input from device 1200. In some embodiments, the input is collected from sensors of device 1200 that track movement, positioning, rotation, tilt, and/or orientation of device 1200. For instance, the sensors may include rotational sensors, inertial sensors, gyroscopes, and/or cameras that track movement of device 1200 across two or more dimensions. In some embodiments, the input is collected from sensors that track the user's eye gaze. In some such embodiments, the sensors may include cameras or eye tracking sensors that track where the user's eyes are looking in two or more dimensions or the positions in a 2D or 3D space that the eyes are focused on or are looking at.

3D GUI system 900 determines (at 1206) a change to the viewport based on the received (at 1204) input. In some embodiments, the viewport corresponds to the viewing angle at which the 3D GUI is rendered or presented. In some other embodiments, the viewport corresponds to the viewing angle at which the user views the 3D GUI. In still some other embodiments, the viewport corresponds to the user's line-of-sight, wherein the line-of-sight encompasses a visible region of the 3D GUI, and may change in response to user head movements, changes to the eye gaze, and/or distance between the user and the display presenting the 3D GUI. Determining (at 1206) the change to the viewport may include measuring changes to the viewing angle or the user line-of-sight, and/or computing the direction and/or angle of the movement associated with the input (e.g., changing head position, eye gaze, or distance from the display).

3D GUI system 900 changes the render position within the point clouds and/or mesh models for the 3D GUI elements of the 3D GUI based on the input and/or the change to the viewport. In some embodiments, changing the render position includes changing the angle from which the 3D GUI elements are rendered to align with the change in the angle of device 1200 or the user's eye gaze. Specifically, 3D GUI system 900 rotates the 3D GUI elements so that the text and/or graphics at the center of each 3D GUI element is aligned with the angle or direction of the viewport, user eye gaze, and/or head position. For instance, in FIG. 12, 3D GUI system 900 detects a 30 degrees downward tilt of the viewport, and rotates the 3D GUI elements upwards by 30 degrees to realign the 3D GUI elements with the viewport.

In some embodiments, 3D GUI system 900 focuses the change on a particular 3D GUI element. For instance, 3D GUI system 900 analyzes the input to determine that the user's gaze is focused on the particular 3D GUI element or that the particular 3D GUI element is selected or highlighted prior to the input being received (at 1204). In some such embodiments, 3D GUI system 900 changes the render position within the point cloud or mesh model of the particular 3D GUI element while leaving the render position of the other 3D GUI elements unchanged.

3D GUI system 900 updates (at 1208) the presentation of one or more of the 3D GUI elements based on the changes to the render positions of the point clouds or mesh models from which the one or more 3D GUI elements are generated. In this manner, 3D GUI system 900 synchronizes the 3D GUI according to the user's head movements and/or eye gaze, and/or allows the user to have a clear view of the 3D GUI elements regardless of the user head position or where the user is looking in the 3D GUI. Specifically, 3D GUI system 900 synchronizes the viewport so that when the user is looking straight ahead, the 3D GUI elements are centered to the user's line of vision and are aligned for clear presentation of each 3D GUI element. Should the user tilt their head up, the 3D GUI elements are no longer aligned with the user's vision but are offset, and 3D GUI system 900 rotates the 3D GUI elements so that the field-of-view from each point cloud or mesh model that is used to generate each 3D GUI element is aligned with the adjusted user's line-of-sight. Specifically, 3D GUI system 900 rotates the 3D GUI elements so the angle at which the 3D GUI elements are rendered match the angle of the user's head placement or eye placement relative to the display or 3D GUI.

Figure 13:
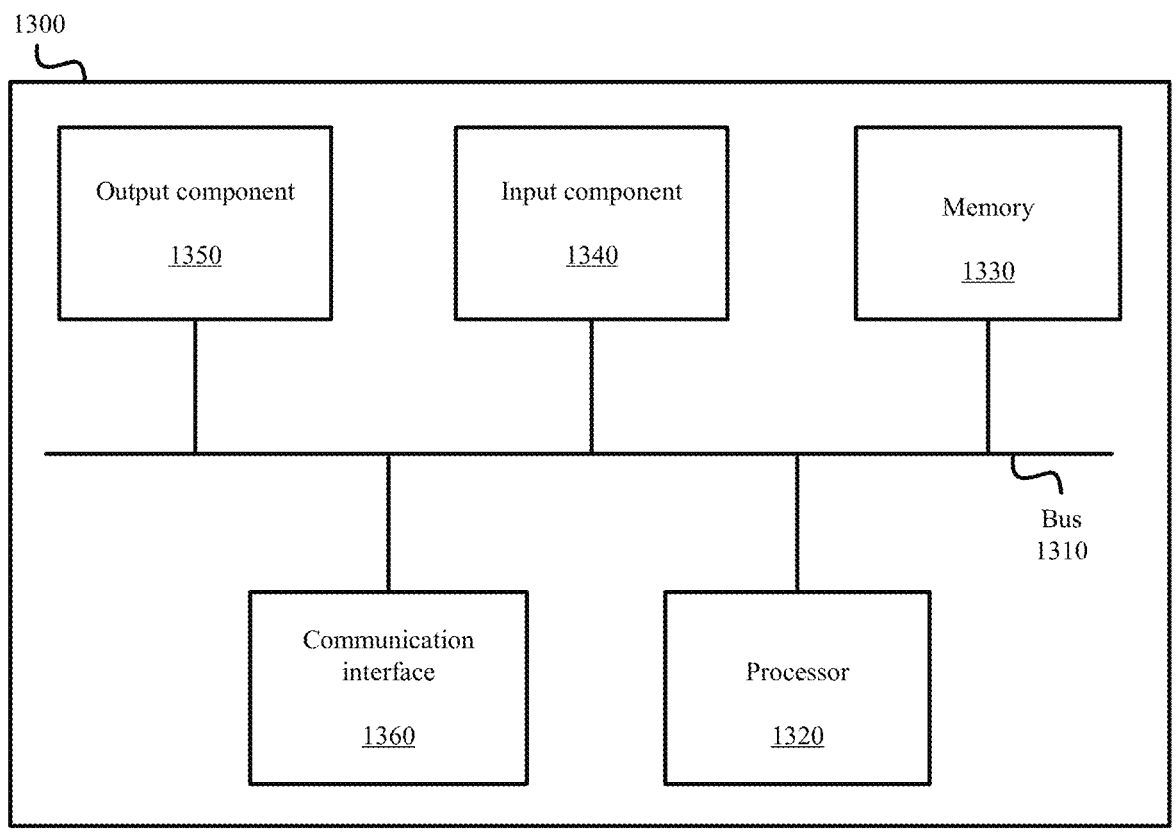
FIG. 13 illustrates example components of one or more devices, according to one or more embodiments described herein.

FIG. 13 is a diagram of example components of device 1300. Device 1300 may be used to implement one or more of the tools, devices, or systems described above (e.g., the 3D GUI 201, the user device that generates and presents the 3D icons, 3D emojis, 3D wallpapers, and/or 3D GUI elements, 3D GUI system 900, etc.). Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more LEDs, etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a first three-dimensional ("3D") mesh model and a second 3D mesh model, wherein the first 3D mesh model comprises a first plurality of meshes defined in a first 3D space, wherein the second 3D mesh model comprises a second plurality of meshes defined in a second 3D space, and wherein the first 3D space is separate from the second 3D space;

selecting a subset of meshes from the second plurality of meshes in response to a first user input;

associating a rule to the subset of meshes in response to a second user input, wherein associating the rule comprises defining an action that invokes the rule and defining a function that is performed in response to the rule being invoked;

setting a first render position in the first 3D space of the first 3D mesh model and a second render position in the second 3D space of the second 3D mesh model;

presenting a first 3D GUI element and a second 3D GUI element in a single 3D graphical user interface ("GUI"), wherein presenting the first 3D GUI element comprises:
determining a first set of meshes from the first plurality of meshes that are in a field-of-view created at the first render position;
mapping the first set of meshes to a visible surface of the first 3D GUI element; and
rendering the first set of meshes on the visible surface of the first 3D GUI element; and wherein presenting the second 3D GUI element comprises:
determining a second set of meshes from the second plurality of meshes that are in a field-of-view created at the second render position;
mapping the second set of meshes to a visible surface of the second 3D GUI element; and
rendering the second set of meshes on the visible surface of the second 3D GUI element;

detecting an input that is applied to the second GUI element;

mapping the input from the second GUI element to the second 3D space of the second 3D mesh model, wherein mapping the input comprises changing from the second render position to a third render position in the second 3D space without changing the first render position in the first 3D space based on a direction and magnitude with which the input is applied to the second GUI element;

mapping a third set of meshes from the second plurality of meshes on the visible surface of the second 3D GUI element in response to the third set of meshes coming into an updated field-of-view in the second 3D space as a result of moving from the second render position to the third render position; and updating the second 3D GUI element based on a visualization that is created from rendering the third set of meshes that are mapped to the visible surface of the second 3D GUI element.

2. The method of claim 1 further comprising:
tracking a position or an orientation of a device that displays the 3D GUI;
determining that the device moves from a first position or a first orientation to a second position or a second orientation in response to said tracking;
changing a last render position in the first 3D space and the second 3D space according to the device moving from the first position or the first orientation to the second position or the second orientation;
updating a visualization of the first 3D GUI element and the second 3D GUI element based on different sets of meshes that come into view after changing the last render position in the first 3D space and the second 3D space.

3. The method of claim 1 further comprising:
tracking an eye gaze of a user; and
wherein detecting the input comprises:
determining that the eye gaze changes from a first position to a second position.

4. The method of claim 1 further comprising:
animating the first and second 3D GUI elements by presenting different sets of meshes that come into view in response to an input that changes a position from which to render the 3D GUI.

5. The method of claim 1,
wherein detecting the input comprises determining a change to a user line-of-sight; and
wherein updating the second 3D GUI element comprises aligning a visualization of the second 3D GUI element according to the change to the user line-of-sight.

6. The method of claim 1 further comprising:
detecting a first input that is applied to the second 3D GUI element when the second 3D GUI element is rendered with the second set of meshes from the second render position;
determining a first rule that is associated with the second set of meshes;
executing a first action based on the first rule that is associated with the second set of meshes and the first rule linking execution of the first action to an application of the first input on one or more of the second set of meshes.

7. The method of claim 6 further comprising:
detecting a second input that is applied to the second 3D GUI element when the second 3D GUI element is rendered with the third set of meshes;
selecting a second rule that is associated with the third set of meshes; and
executing a second action based on the second rule that is associated with the third set of meshes and the second rule linking execution of the second action to an application of the second input on one or more of the third set of meshes.

8. The method of claim 1 further comprising:
presenting the 3D GUI on a plurality of devices; and
synchronizing the 3D GUI across the plurality of devices in response to detecting the input from a single device of the plurality of devices, wherein synchronizing the 3D GUI comprises updating a visualization of the second 3D GUI element with the third set of meshes for each device of the plurality of devices.

9. The method of claim 1 further comprising:
performing the function in response to a second input being applied to one or more meshes of the third set of meshes presented by the second 3D GUI element and the one or more meshes corresponding to the subset of meshes that is associated with the rule that links the second input to the function; and
performing a different second function in response to a third input being applied to one or more meshes of the third set of meshes presented by the second 3D GUI element and the rule linking the third input to the second function.

10. The method of claim 1 further comprising:
presenting the 3D GUI on a plurality of devices;
detecting a second input from a particular device of the plurality of devices that rotates the first 3D GUI element; and synchronizing the 3D GUI across the plurality of devices in response to detecting the second input, wherein synchronizing the 3D GUI comprises:
  changing from the first render position to a fourth render position in the first 3D space of the first 3D mesh model; and
  rotating the first 3D GUI element across the plurality of devices to present different meshes from the first plurality of meshes that come into view in response to changing from the first render position to the fourth render position.

11. The method of claim 1 further comprising:
receiving a notification from an application that is accessed using the first 3D GUI element; and
updating a visualization of the first 3D GUI element in response to receiving the notification by changing the first render position in the first 3D space to a fourth render position that brings a set of the first plurality of meshes associated with the notification into view.

12. A system comprising:
one or more hardware processors configured to:
  receive a first three-dimensional ("3D") mesh model, wherein the first 3D mesh model comprises a first plurality of meshes defined in a first 3D space, wherein the second 3D mesh model comprises a second plurality of meshes defined in a second 3D space, and wherein the first 3D space is separate from the second 3D space;
  select a subset of meshes from the second plurality of meshes in response to a first user input;
  associate a rule to the subset of meshes in response to a second user input, wherein associating the rule comprises defining an action that invokes the rule and defining a function that is performed in response to the rule being invoked;
  set a first render position in the first 3D space of the first 3D mesh model and a second render position in the second 3D space of the second 3D mesh model;
  present a first 3D GUI element and a second 3D GUI element in a single 3D graphical user interface ("GUI"),
    wherein presenting the first 3D GUI element comprises:
      determining a first set of meshes from the first plurality of meshes that are in a field-of-view created at the first render position;
      mapping the first set of meshes to a visible surface of the first 3D GUI element; and
      rendering the first set of meshes on the visible surface of the first 3D GUI element; and
    wherein presenting the second 3D GUI element comprises:
      determining a second set of meshes from the second plurality of meshes that are in a field-of-view created at the second render position;
      mapping the second set of meshes to a visible surface of the second 3D GUI element; and
      rendering the second set of meshes on the visible surface of the second 3D GUI element;
  detect an input that is applied to the second GUI element;
  map the input from the second GUI element to the second 3D space of the second 3D mesh model, wherein mapping the input comprises changing from the second render position to a third render position in the second 3D space without changing the first render position in the first 3D space based on a direction and magnitude with which the input is applied to the second GUI element;
  map present the second 3D GUI element based on a third set of meshes from the second plurality of meshes on the visible surface of the second 3D GUI element in response to the third set of meshes coming into an updated field-of-view in the second 3D space as a result of moving from the second render position to the third render position; and
  update the second 3D GUI element based on a visualization that is created from rendering the third set of meshes that are mapped to the visible surface of the second 3D GUI element.

13. The system of claim 12, wherein the one or more hardware processors are configured to:
track a position or an orientation of a device that displays the 3D GUI;
determine that the device moves from a first position or a first orientation to a second position or a second orientation in response to said tracking;
change a last render position in the first 3D space and the second 3D space according to the device moving from the first position or the first orientation to the second position or the second orientation;
update a visualization of the first 3D GUI element and the second 3D GUI element based on different sets of meshes that come into view after changing the last render position in the first 3D space and the second 3D space.

14. The system of claim 12, wherein the one or more hardware processors are configured to:
track an eye gaze of a user; and
wherein detecting the input comprises:
  determining that the eye gaze changes from a first position to a second position.

15. The system of claim 12,
wherein detecting the input comprises determining a change to a user line-of-sight; and
wherein updating the second 3D GUI element comprises aligning a visualization of the second 3D GUI element according to the change to the user line-of-sight.

16. The system of claim 12, wherein the one or more hardware processors are configured to:
present the 3D GUI on a plurality of devices;
detect a second input from a particular device of the plurality of devices that rotates the first 3D GUI element; and
synchronize the 3D GUI across the plurality of devices in response to detecting the second input, wherein synchronizing the 3D GUI comprises:
  changing from the first render position to a fourth render position in the first 3D space of the first 3D mesh model; and
  rotating the first 3D GUI element across the plurality of devices to present different meshes from the first plurality of meshes that come into view in response to changing from the first render position to the fourth render position.

17. The system of claim 12, wherein the one or more hardware processors are configured to:
receive a notification from an application that is accessed using the first 3D GUI element; and
update a visualization of the first 3D GUI element in response to receiving the notification by changing the first render position in the first 3D space to a fourth render position that brings a set of the first plurality of meshes associated with the notification into view.

18. A non-transitory computer-readable medium storing instructions that, when executed by one or more processors of a three-dimensional ("3D") graphical user interface ("GUI") system, cause the 3D GUI system to perform operations comprising:

receiving a first 3D mesh model and a second 3D mesh model, wherein the first 3D mesh model comprises a first plurality of meshes defined in a first 3D space, wherein the second 3D mesh model comprises a second plurality of meshes defined in a second 3D space, and wherein the first 3D space is separate from the second 3D space;

selecting a subset of meshes from the second plurality of meshes in response to a first user input;

associating a rule to the subset of meshes in response to a second user input, wherein associating the rule comprises defining an action that invokes the rule and defining a function that is performed in response to the rule being invoked;

setting a first render position in the first 3D space of the first 3D mesh model and a second render position in the second 3D space of the second 3D mesh model;

presenting a first 3D GUI element and a second 3D GUI element in a single 3D graphical user interface ("GUI"), wherein presenting the first 3D GUI element comprises:

determining a first set of meshes from the first plurality of meshes that are in a field-of-view created at the first render position;

mapping the first set of meshes to a visible surface of the first 3D GUI element; and rendering the first set of meshes on the visible surface of the first 3D GUI element; and wherein presenting the second 3D GUI element comprises:

determining a second set of meshes from the second plurality of meshes that are in a field-of-view created at the second render position;

mapping the second set of meshes to a visible surface of the second 3D GUI element; and rendering the second set of meshes on the visible surface of the second 3D GUI element;

detecting an input that is applied to the second GUI element;

mapping the input from the second GUI element to the second 3D space of the second 3D mesh model, wherein mapping the input comprises changing from the second render position to a third render position in the second 3D space without changing the first render position in the first 3D space based on a direction and magnitude with which the input is applied to the second GUI element;

mapping a third set of meshes from the second plurality of meshes on the visible surface of the second 3D GUI element in response to the third set of meshes coming into an updated field-of-view in the second 3D space as a result of moving from the second render position to the third render position; and updating the second 3D GUI element based on a visualization that is created from rendering the third set of meshes that are mapped to the visible surface of the second 3D GUI element.

* * * * *